US011539935B2

(12) United States Patent
Bosworth et al.

(10) Patent No.: US 11,539,935 B2
(45) Date of Patent: Dec. 27, 2022

(54) VIDEOTELEPHONY WITH PARALLAX EFFECT

(71) Applicant: Meta Platforms Technologies, LLC, Menlo Park, CA (US)

(72) Inventors: Andrew Garrod Bosworth, San Mateo, CA (US); Timo Juhani Ahonen, Belmont, CA (US); Brian Keith Cabral, San Jose, CA (US); Ryan Cairns, Los Altos Hills, CA (US); Andrea Colaco, Los Altos, CA (US); Jonathan Huang, Sunnyvale, CA (US); Michael Fredrick Cohen, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/110,233

(22) Filed: Dec. 2, 2020

(65) Prior Publication Data

US 2022/0174257 A1 Jun. 2, 2022

(51) Int. Cl.
| | |
|---|---|
| *H04N 13/282* | (2018.01) |
| *H04N 13/156* | (2018.01) |
| *H04N 13/243* | (2018.01) |
| *H04N 13/00* | (2018.01) |
| *H04N 13/117* | (2018.01) |
| *H04N 13/366* | (2018.01) |

(Continued)

(52) U.S. Cl.
CPC ......... *H04N 13/282* (2018.05); *H04N 13/117* (2018.05); *H04N 13/156* (2018.05); *H04N 13/243* (2018.05); *H04N 13/366* (2018.05); *H04N 13/398* (2018.05); *H04N 7/141* (2013.01); *H04N 2013/0074* (2013.01)

(58) Field of Classification Search
CPC .. H04N 13/282; H04N 13/117; H04N 13/366; H04N 13/243; H04N 13/156; H04N 13/398; H04N 7/141; H04N 2013/0074
USPC ........................................................ 348/43
See application file for complete search history.

(56) References Cited

U.S. PATENT DOCUMENTS

2008/0298571 A1* 12/2008 Kurtz ..................... H04N 7/142
379/156
2013/0195204 A1* 8/2013 Reznik ............. H04N 21/44218
375/240.26

(Continued)

OTHER PUBLICATIONS

López, et al., Head-tracking virtual 3-D display for mobile devices, University of Oulu, Finland, pp. 1-8.

*Primary Examiner* — Tung T Vo
(74) *Attorney, Agent, or Firm* — Baker Botts L.L.P.

(57) ABSTRACT

In one embodiment, a computing system may receive, from a second computing system, video streams of a scene, the video streams including at least a first image and a second image that are simultaneously captured by a first camera and a second camera of the second computing system, respectively. The system may determine, using a sensor system, a viewpoint of a viewer with respect to a display region of a monoscopic display associated with the first computing system. The system may generate an output image of the scene by blending, according to blending proportions computed using the viewpoint of the viewer, corresponding portions of the first image and the second image. The system may display the output image in the display region of the monoscopic display.

20 Claims, 23 Drawing Sheets

(51) Int. Cl.
*H04N 13/398* (2018.01)
*H04N 7/14* (2006.01)

(56) References Cited

U.S. PATENT DOCUMENTS

| | | | |
|---|---|---|---|
| 2014/0015918 A1* | 1/2014 | Six | H04N 7/144 348/14.16 |
| 2014/0098183 A1* | 4/2014 | Smith | H04N 13/243 348/14.16 |
| 2016/0353058 A1* | 12/2016 | Caviedes | H04N 7/15 |
| 2018/0131902 A1* | 5/2018 | Rosenberg | G06F 3/013 |
| 2018/0189550 A1* | 7/2018 | McCombe | G06K 9/00288 |
| 2018/0192001 A1* | 7/2018 | Boyce | H04N 19/46 |
| 2019/0342632 A1* | 11/2019 | DeFaria | G06T 15/205 |
| 2020/0043133 A1* | 2/2020 | Boyce | H04N 5/23238 |
| 2020/0045286 A1* | 2/2020 | Boyce | H04N 13/117 |
| 2020/0349769 A1* | 11/2020 | Yuan | G06T 7/248 |

* cited by examiner

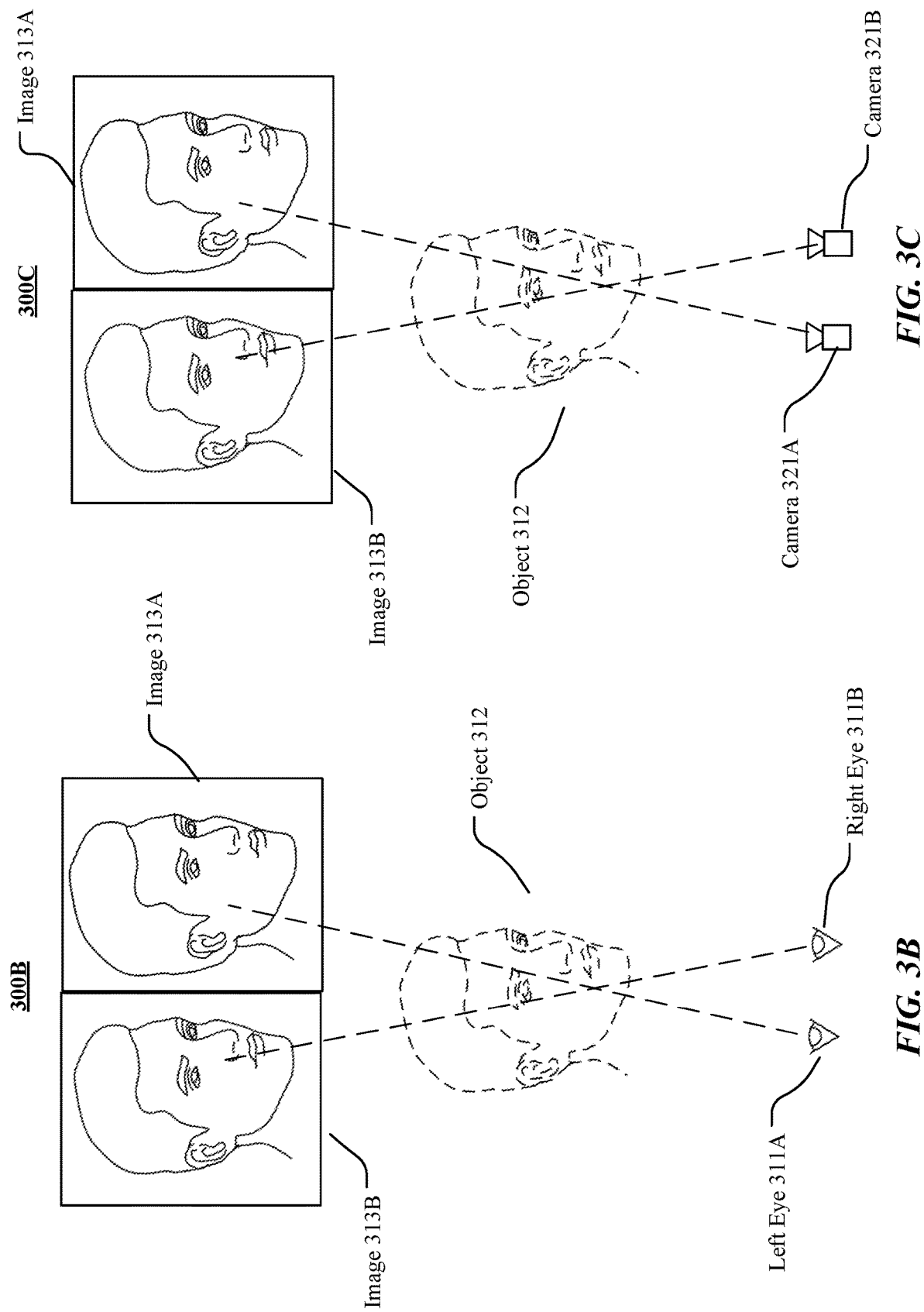

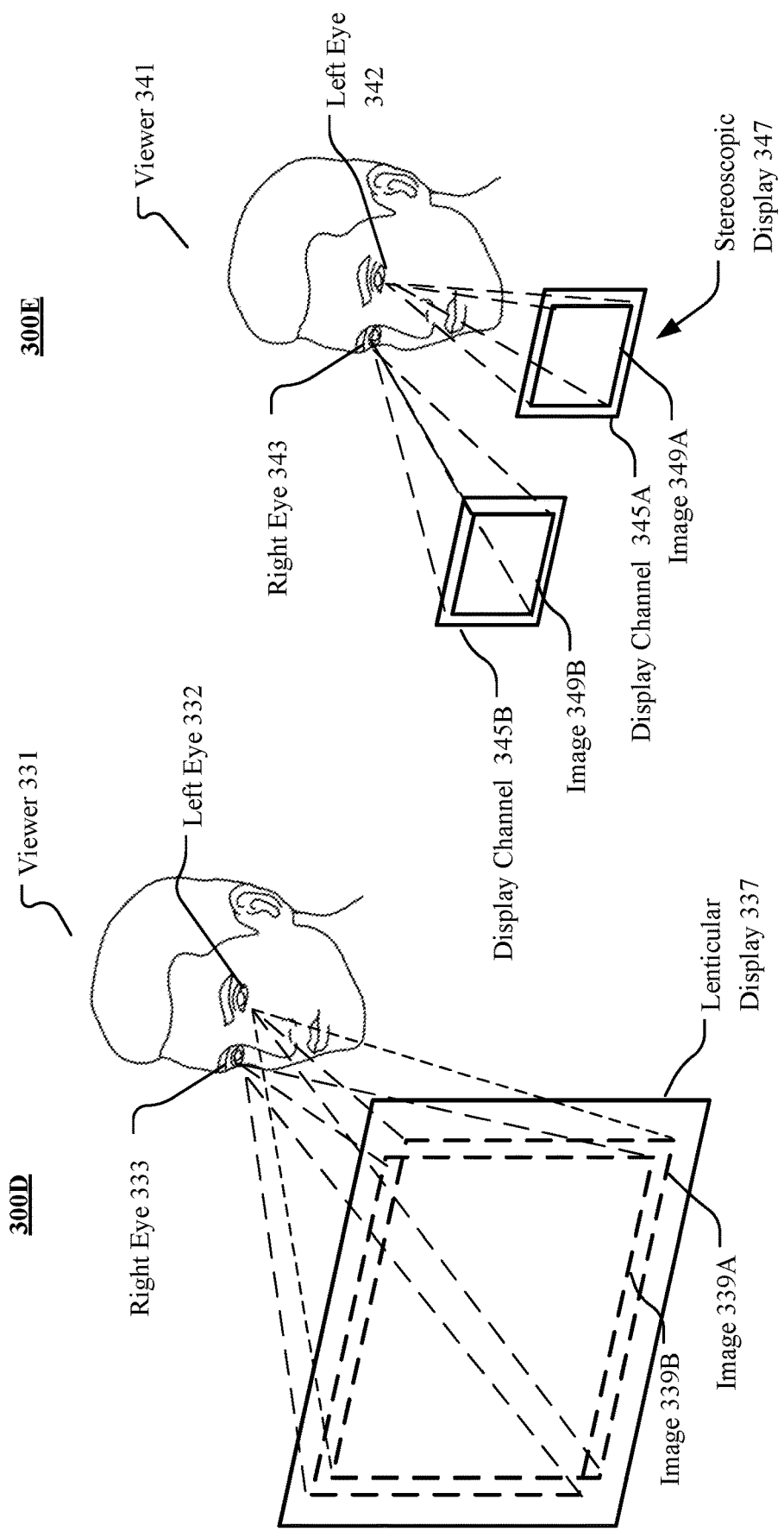

VIDEOTELEPHONY WITH PARALLAX EFFECT

TECHNICAL FIELD

This disclosure generally relates to computer graphic technologies, particularly to videotelephony and artificial reality.

BACKGROUND

Videotelephony system may allow users at different locations to communicate remotely with each other through video/audio streams. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for rendering and displaying videos with head-motion parallax effect, even when the videos are displayed on a traditional monoscopic display. The system may include at least one sender-side device and at least one receiver-side device. The sender-side device may include at least two cameras (e.g., RGB cameras) arranged at different positions. These cameras may be synchronized to capture video streams from different perspectives corresponding to respective camera positions. For example, when the sender-side device has two cameras arranged at different positions, the two cameras may capture videos from two different perspectives along one dimension. When the sender-side device has at least three cameras arranged at different positions that form a two-dimensional plane, the sender-side device may capture videos from different perspectives along two perpendicular dimensions. The video streams may be compressed and sent to the receiver-side device together with metadata that includes position information of the sender-side cameras. The receiver-side device may receive the compressed video data and corresponding metadata, un-compress the received data, and render and display a video to the viewer with the head-motion parallax effect. The receiver-side device may include at least one camera or sensor for tracking the viewpoint (e.g., a head position, eye positions, a center position of two eyes) of the viewer. The receiver-side device may use an image-based rendering (IBR) method to fuse the video frames that are captured simultaneously from different perspective of the scene to generate an output video based on the viewpoint of the viewer. The receiver-side device may determine the correspondence between different image portions in respective images that are captured simultaneously by the sender-side cameras by matching corresponding features (e.g., nose, eyes, ears, chin) captured in one perspective image to other perspective image(s). The pixel values in an output image that generated based on the viewer's head position may be determined based on a weighted average of corresponding pixels of respective perspective images (with corresponding weight values being determined based on the viewer's viewpoint with respect to a receiver-side display). Then, the receiver-side device may display the output images to the viewer. When the viewer's viewpoint changes with respect to the receiver-side display, the video displayed to the viewer may reveal different perspectives of the sender-side scene and may appear as if the viewer is looking at the sender-side scene in real world.

In particular embodiments, instead of using the image-based rendering (IBR) method, the system may use a model-based method to render and display videos with head-motion parallax effect. The sender-side device may include at least one depth sensor (which could be a pair of stereo cameras) and at least one camera for capturing RGB data. The sender-side device may use the camera(s) to capture a video of the scene within the sender-side camera's field of view and use the depth sensor to capture depth information (e.g., a point cloud) of the scene. The depth information may be used to generate geometry information for the scene (e.g., a point cloud, a mesh grid, a contour map, or a 3D model for an object). The receiver-side device may use the geometry information to generate output images based on the viewer's viewpoint. For example, the receiver-side device may use a ray-casting method to determine the areas on the geometric model that are visible to the viewer from the viewer's viewpoint. Then, based on the visibility information, the receiver-side device may determine the texture for the visible areas by sampling the corresponding images captured by the sender-side cameras. The pixel values in the output image may be determined based on a weighted average of corresponding pixel values in respective perspective images. Alternatively, the pixel values in the output images may be determined based on pixel values of images captured by a particular camera having a viewpoint that closest to the viewer's viewpoint. Then, the receiver-side device may display the output images to the viewer on a display (e.g., within a display region). When the viewer's viewpoint changes with respect to the display, the video displayed to the viewer may reveal different perspectives of the sender-side scene and may appear as if the viewer is looking at the scene in the real world. In particular embodiments, the depth information of the sender-side scene may be determined by a machine-learning model based on data received from one or more depth sensors or/and cameras.

In particular embodiments, the rendering process (e.g., generating the output images based using image-based rendering method or model-based rendering method) may be performed by the receiver-side device. In particular embodiments, a single sender-side device may support multiple receiver-side devices simultaneously or concurrently. For example, the sender-side device may capture video frames from different perspectives (with or without the depth data) and send the captured data to multiple receiver-side devices. Each receiver-side device may render its own video (e.g., using the image-based rendering method or model-based rendering method) with head-motion parallax effect based on the corresponding viewer's viewpoint of that receiver-side device. As a result, each viewer may view the sender-side scene from a different perspective. In particular embodiments, the rendering process may be performed by the sender-side device. For example, the receiver-side device may determine the viewpoint of the viewer and send the viewpoint information to the sender-side device. The sender-side device may predict the viewpoint of the viewer factoring in the round-way communication latency, generate the output images according to the predicted viewpoint of the viewer, and send the output images to the receiver-side device for displaying. The receiver-side device may be a relatively low-cost device with limited computation resources since the rendering process is performed by the sender-side device. In particular embodiments, the system may adaptively determine which device (e.g., the sender-side device or the receiver-side device) to perform the rendering process based on the available computation resources or/and configuration of each device.

In particular embodiments, the system may be a unidirectional or bidirectional videotelephony system. For the bidirectional systems, the roles of the sender-side device and the receiver-side device may be flipped. The device at each side may serve as a sender-side device and a receiver-side device simultaneously or concurrently. In particular embodiments, the output images may be generated according to an opposite viewpoint to the viewer's viewpoint. As a result, the sender's face being displayed to the viewer may appear to follow the motion of the viewer's viewpoint when the viewer's viewpoint changes with respect to the receiver-side display. In particular embodiments, the receiver-side device may use a monoscopic display to display the rendered video with a parallax effect. At a particular time moment, the same output image of the scene may be displayed to the viewer's left eye and right eye. To further provide stereoscopic effects, particular embodiments may render two different output images to the viewer (one output image for each eye). For example, the receiver-side device may render a first output image to the viewer's left eye and a second output image to the viewer's right eye, respectively. Then, the receiver-side device may display the two output images to the viewer's two eyes through two display channels (e.g., a lenticular display or a VR/AR headset display that can display two different images to the user's two eyes), respectively.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system, and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3B illustrates an example process on how human eyes view objects in the real world FIG. 3C illustrates an example process for capturing stereo images.

FIG. 3D illustrates an example process for displaying two different images to the viewer's two eyes using a lenticular display.

FIG. 3E illustrates an example process for displaying two different images to the viewer's two eyes using two display channels of a stereoscopic display.

DESCRIPTION OF EXAMPLE EMBODIMENTS

Figure 1:
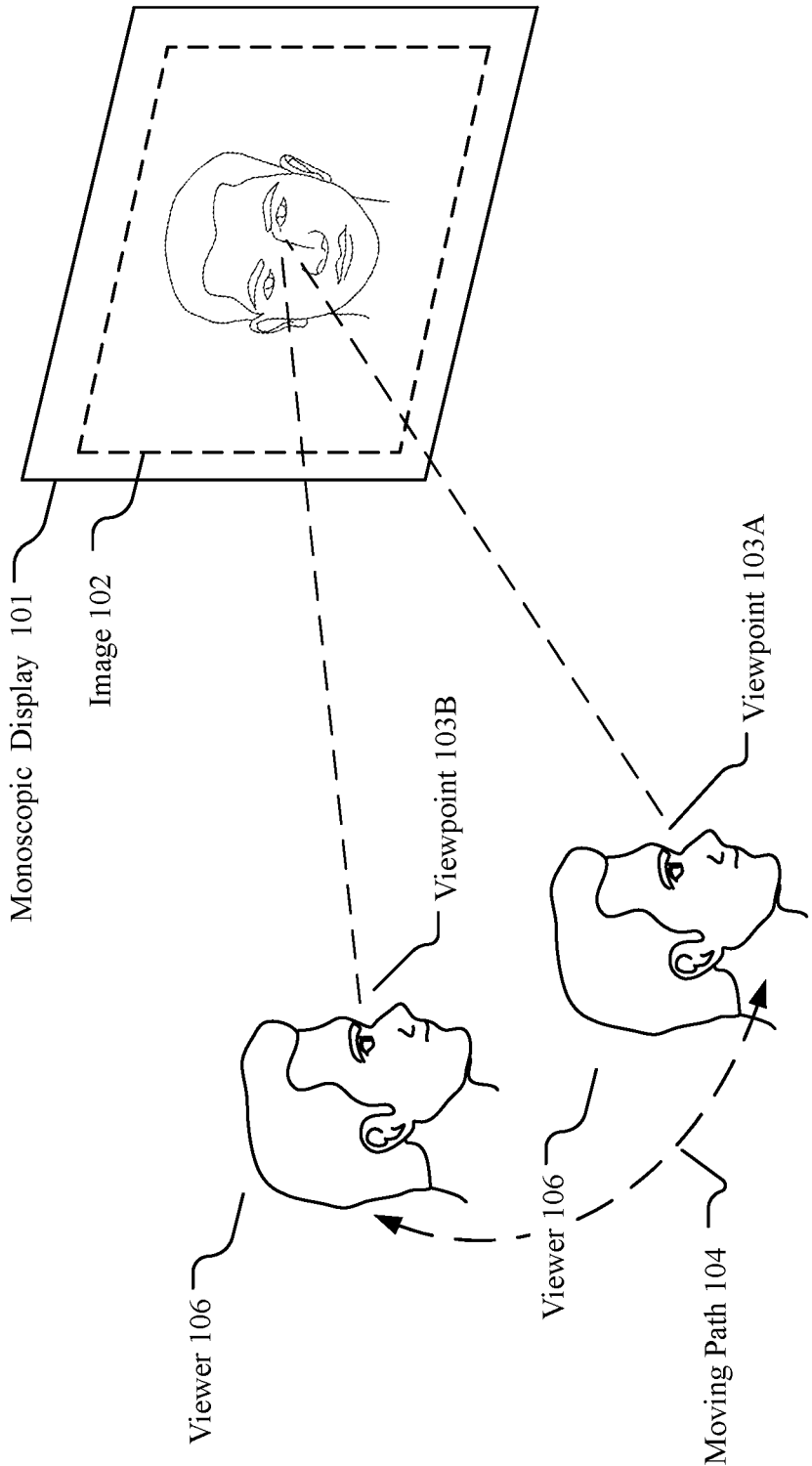
FIG. 1 illustrates an example process of using a monoscopic display to display images without head-motion parallax effect.

FIG. 1 illustrates an example process 100 of using a monoscopic display to display images without head-motion parallax effect. A videotelephony system may allow users at different locations to communicate remotely with each other through real-time video/audio stream. Particular embodiments of the videotelephony system may use a monoscopic display to display video streams captured by the sender's camera to the viewer regardless of the viewer's head position. Therefore, the displayed video may appear unnatural to the viewer due to the lack of parallax and stereoscopic effects and may lead to a less optimal user experience. As an example and not by way of limitation, the videotelephony system may use a traditional two-dimensional display (e.g., a monoscopic display 101) to display an image 102 to a viewer 106 without head-motion parallax effect. When the viewer's viewpoint (e.g., 103A, 103B) moves around within the 3D space (e.g., along a moving path 104), the relative position of the user's viewpoint (e.g., 103A, 103B) may change with respect to the display 101. However, wherever the user's viewpoint is located, the perspectives of the scene revealed by the displayed image (e.g., 102) may change according to the user's viewpoint (e.g., 103A and 103B). For example, the display 101 may display the same image 102 to the user 106 regardless of the position of the user's viewpoint (e.g., 103A, 103B). As another example, the display 101 may display images that reveal the same perspective of a scene regardless of the position of the user's viewpoint (e.g., 103A, 103B). As another example, the display 101 may display images that may reveal different perspectives of the scene based on how these images are captured regardless of the position of the viewer's viewpoint (e.g., 103A, 103B). As a result, the displayed images or video may not have a head-motion parallax effect.

Figures 2A, 2B:
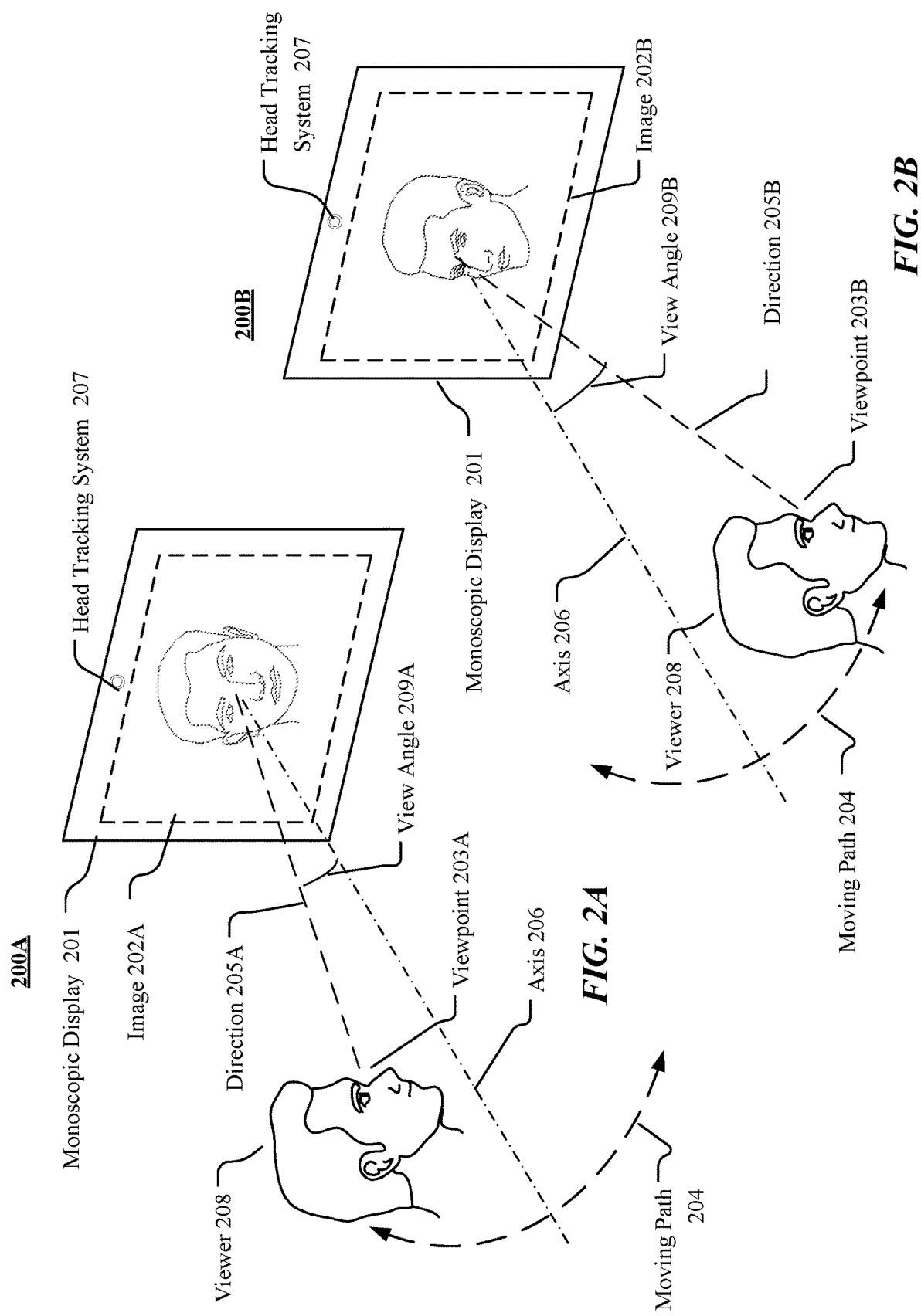
FIGS. 2A-2B illustrate an example process of using a monoscopic display to achieve a head-motion parallax effect.

FIGS. 2A-2B illustrate an example process (200A and 200B) of using a monoscopic display to achieve a head-motion parallax effect. Particular embodiments of the system may use a head tracking system or eye-tracking system to determine the viewer's viewpoint (e.g., a head position, eye positions, a center position of two eyes) with respect to the display of the receiver-side device. Then, the system may render and display output images based on the viewer's viewpoint. When the viewer's viewpoint changes with respect to the display, the system may render and display videos that reveal different perspectives of the scene to the viewer according to the position of the viewer's viewpoint. As an example and not by way of limitation, the system may use a head tracking system 207 to determine the viewpoint 203A of the viewer 208. The viewpoint 203A may be determined by the head tracking system 207 with respect to the position of the head tracking system 207. Then, the system may determine the relative position and corresponding view angles of the viewpoint 203A with respect to the display 201. For example, the system may determine a view direction 205A from the center of the viewer's two eyes to the center of the display 201. The system may determine a two-dimensional angle 209A (or a one-dimensional angle) of the view direction 205A with respect to an axis 206 which is perpendicular to the display 201. Then, the system may render and display an image 202A based on parameters (e.g., a view direction, a one-dimensional view angle, or a two-dimensional view angle) determined from the viewer's viewpoint 203A. As a result, the display image 202A may reveal a perspective of the scene (e.g., the sender-side user's face) according to the viewer's viewpoint 203A as if the viewer 208 is looking at the scene (e.g., the sender-side user's face) in the real world.

In particular embodiments, when the viewer 208 moves around in the 3D space, the system may dynamically determine the viewer's viewpoint (e.g., 203A, 203B) and render and display output images according to the viewer's viewpoint (e.g., 203A, 203B). As an example and not by way of limitation, when the viewer 208 moves from the viewpoint 203A to the viewpoint 203B (e.g., along the moving path 204 or any moving path), the system may use the head tracking system 207 to determine the viewpoint 203B of the viewer 208. The viewpoint 203B may be determined by the head tracking system 207 with respect to the position of the head tracking system 207. Then, the system may determine the relative position and corresponding view angles of the viewpoint 203B with respect to the display 201. For example, the system may determine a view direction 205B from the center of the viewer's two eyes to the center of the display 201. The system may determine a two-dimensional view angle 209B (or one-dimensional view angle) of the view direction 205B with respect to an axis 206 which is perpendicular to the display 201. Then, the system may render and display an image 202B based on parameters (e.g., a view direction, a one-dimensional view angle, or a two-dimensional view angle) determined based on the viewer's viewpoint 203B. As a result, the display image 202B may reveal a perspective of the scene (e.g., the sender-side user's face) according to the viewer's viewpoint 203B as if the viewer 208 is looking at the scene (e.g., the sender-side user's face) in the real world. When the viewer 208 moves around within the 3D space, the system may dynamically render and display output images that reveal different perspectives of the scene according to the viewer's viewpoint (e.g., 203A and 203B). As a result, the system may achieve a head-motion parallax effect using the monoscopic display 201 and the system may display videos that appear to be more natural and realistic to the viewer and improve the user experience of the videotelephony system.

Figure 3A:
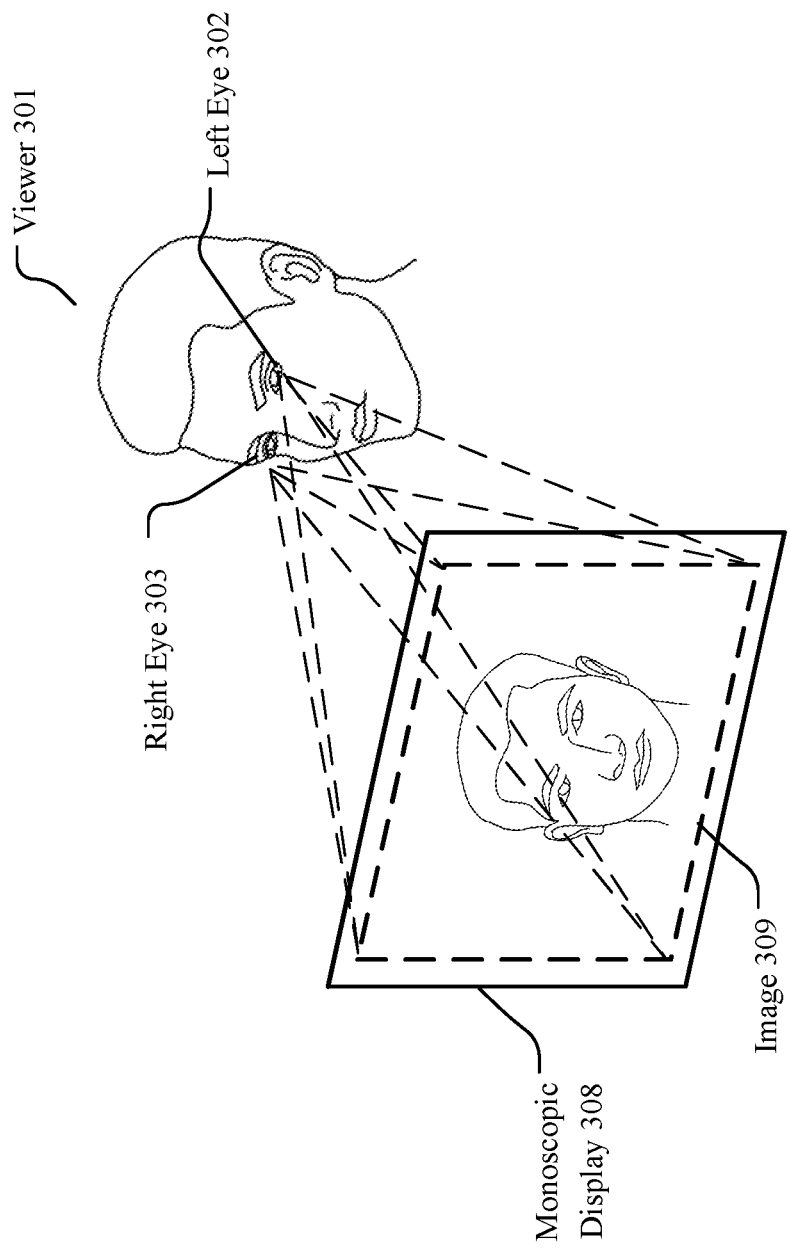
FIG. 3A illustrates an example monoscopic display which displays the same image to both eyes of the viewer.
Figure 8A:
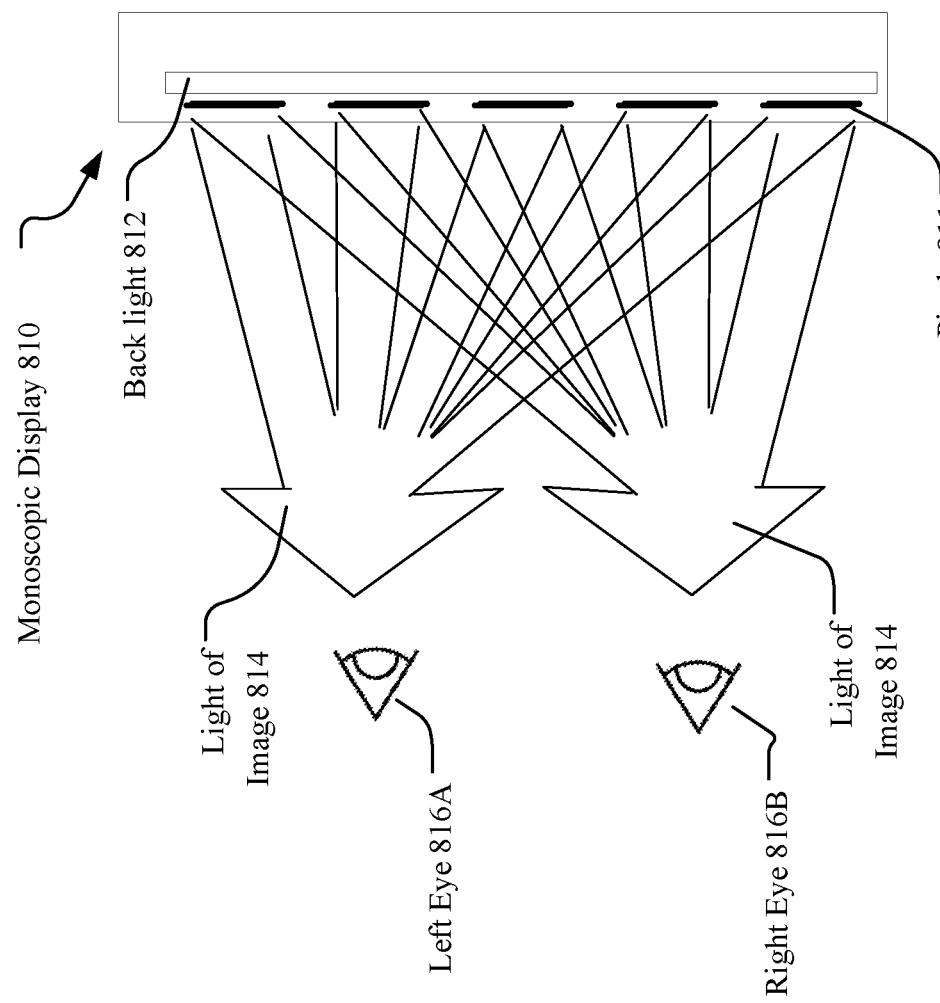
FIG. 8A illustrates an example of a monoscopic display.

FIG. 3A illustrates an example of a monoscopic display 300A which displays the same image to both eyes of the viewer. An example structure of the monoscopic display 308 is illustrated in FIG. 8A. As an example and not by way of limitation, the system may display, on the monoscopic display 308, an image 309 to the viewer 301 when the viewer has a particular viewpoint. The same image 309 may be displayed to both the left eye 302 and the right eye 303 of the viewer 301. When the viewer views the displayed image 309 through either the left eye 302 or the right eye 303, the viewer may see exactly the images 309 without stereo effect. As a result, the display image 209 may appear flat and unnatural to the viewer 301.

FIG. 3B illustrates an example process 300B on how human eyes view objects in the real world. As an example and not by way of limitation, when the two eyes 311A and 311B view the object 312, each eye may see a perspective of the object that is slightly different from the other eye. The left eye 311A may see a first perspective of the object 312 corresponding to a first image 313A and the right eye 313B may see a second perspective of the object 312 corresponding to a second image 313B. As a result, when a viewer views an object in the real world, the object as viewed by the viewer may appear stereo to the viewer because each eye sees a different perspective of the object. It is notable that the stereo effect as described here may also be referred to as "parallax effect" but it is different from the head-motion parallax effect as described in this disclosure.

FIG. 3C illustrates an example process 300C for capturing stereo images. As an example and not by way of limitation, the two cameras 321A and 321B may be arranged at positions corresponding to the two eyes 311A and 311B of the viewer to capture the two images 313A and 313B of the object 312. The first image 313A captured by the camera 321A may correspond to the left eye 311A and the second image 313B captured by the camera 321B may correspond to the right eye 311B. As a result, the system may capture the stereo images 313A and 313B for the two eyes 311A and 311B, respectively. The captured stereo images 313A and 313B may be displayed to the viewer's two eyes through two display channels, respectively.

Figure 8B:
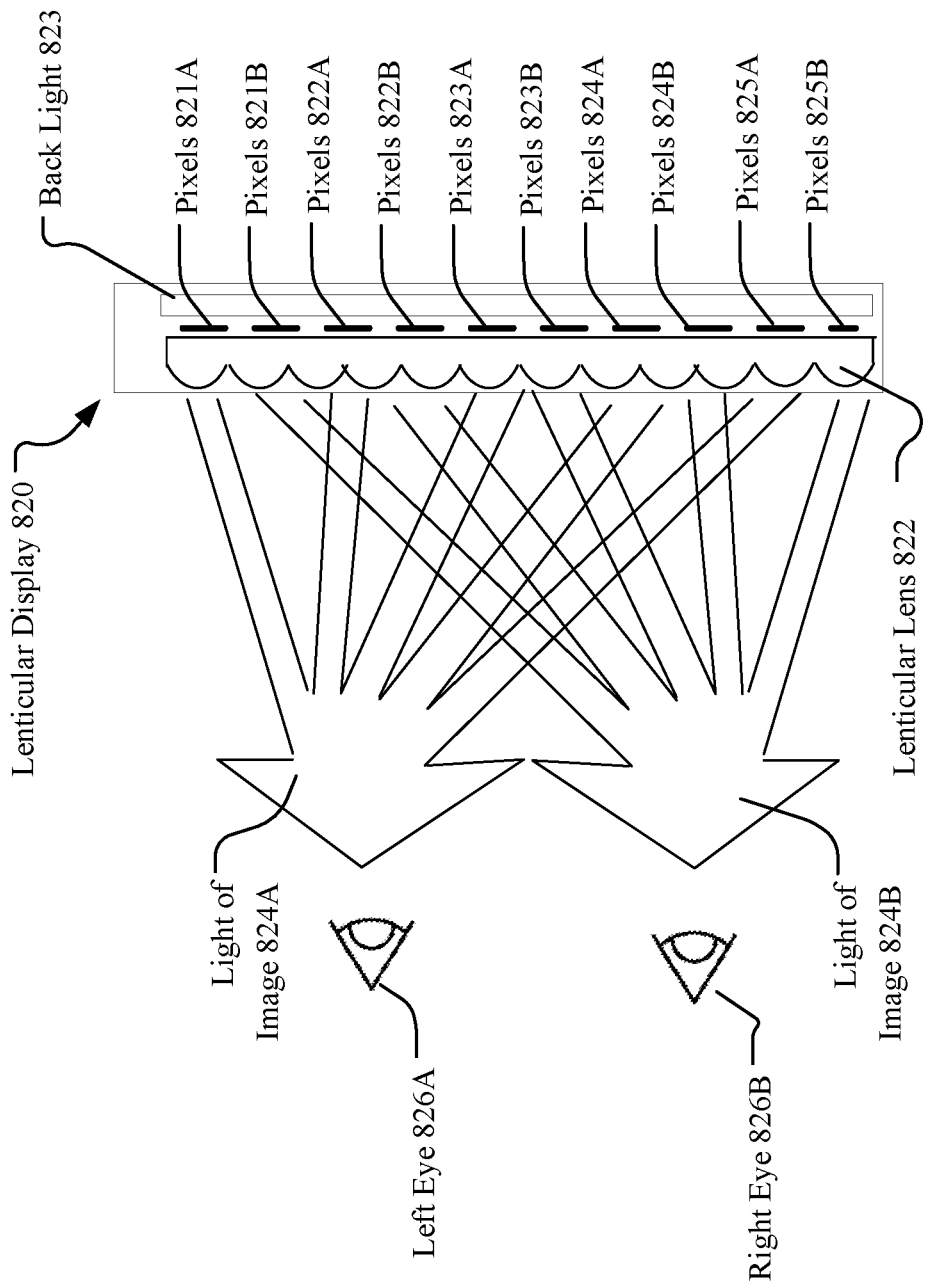
FIG. 8B illustrates an example lenticular display that displays different images to the left and right eyes of a viewer.

FIG. 3D illustrates an example process 300D for displaying two different images to the viewer's two eyes using a lenticular display. A lenticular display (e.g., as illustrated in FIG. 8B) may simultaneously or currently display two different images (e.g., of two different perspectives of the same scene) to a viewer through two or more display channels. As an example and not by way of limitation, the lenticular display 337 may display a first image 339A corresponding to a first perspective of the scene to the viewer's left eye 332. The first image 339A may be displayed by a first subset of pixels of the lenticular display 339A. The light emitted by the first subset of pixels may be directed to the viewer's left eye 332 by the corresponding micro lens (e.g., lenticular lens 822 in FIG. 8B) associated with the first subset of pixels. At the same time, the lenticular display 337A may display a second image 339B corresponding to a second perspective of the scene to the viewer's right eye 333. The second image 339B may be displayed by a second subset of pixels of the lenticular display 337. The light emitted by the second subset of pixels may be directed to the viewer's left eye by the corresponding micro lens (e.g., lenticular lens 822 in FIG. 8B) associated with the second subset of pixels. As a result, the displayed scene as viewed by the viewer 331 may have a stereo effect. It is notable that the displays in this disclosure are not limited to lenticular displays or monoscopic displays. For example, in particular embodiments, the displays may be barrier displays, lenticular displays, light field displays, time multiplexed displays, or any suitable displays.

FIG. 3E illustrates an example process 300E for displaying two different images to the viewer's two eyes using two display channels of a stereoscopic display. In particular embodiments, the stereoscopic display (e.g., head-mounted displays in AR/VR systems) may have two display channels for displaying different perspective images to the viewer's two eyes, respectively. The system may display stereo images to the viewer's two eyes through these two display channels. As an example and not by way of limitation, the stereoscopic display 437 may have a first display channel 345A for the viewer's left eye 342 and a second display channel 345B for the viewer's right eye 343. The system may display a first image 349A corresponding to a first perspective of the scene to the viewer's left eye 342 through the first display channel 345A. At the same time, the system may display a second image 349B corresponding to a second perspective of the scene to the viewer's right eye 343 through the second display channel 345B. As a result, the displayed scene as viewed by the viewer 341 may have a stereo effect. Particular embodiments of the system may render and display videos that have both head-motion parallax and stereo effects to improve the user experience.

Figure 4:
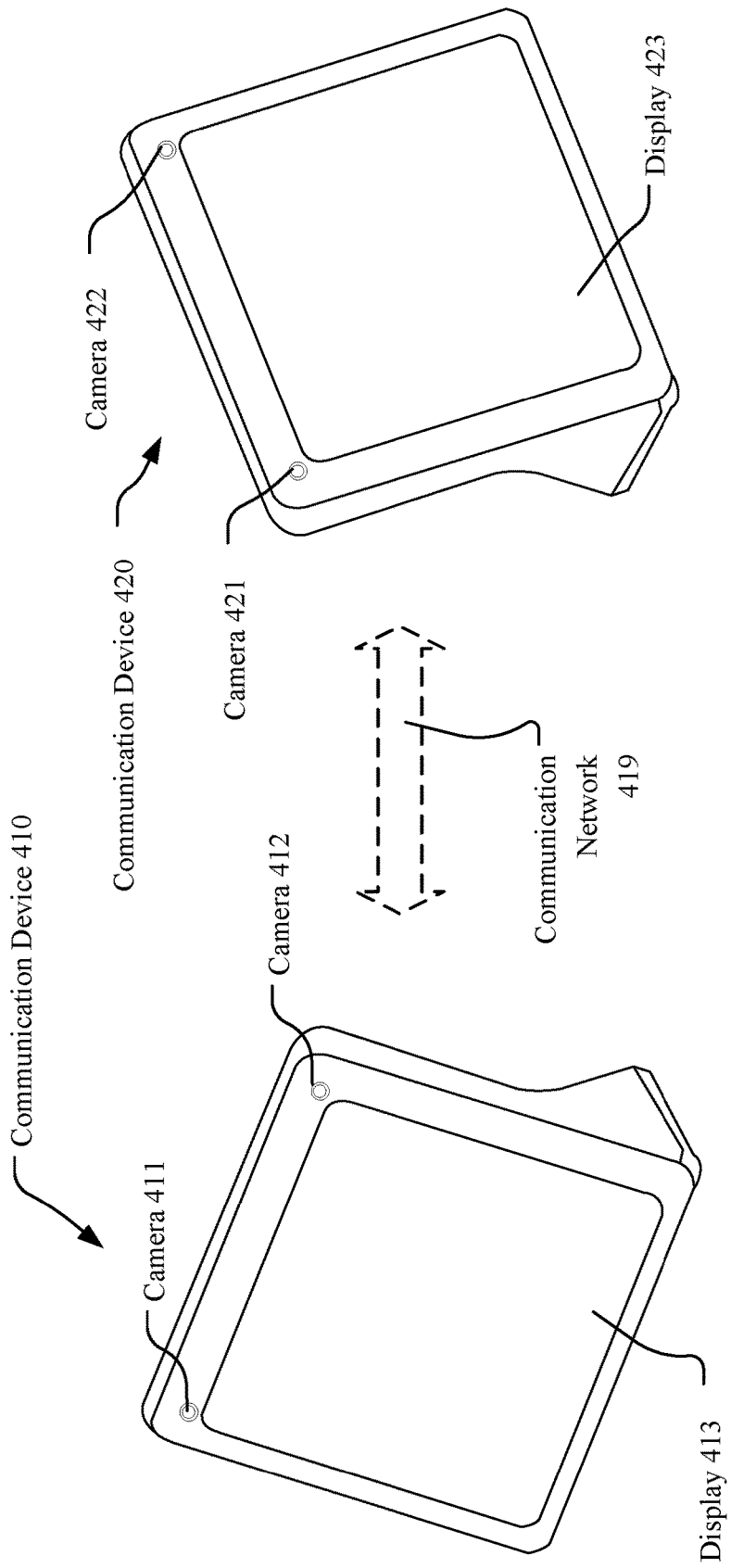
FIG. 4 illustrates an example videotelephony system.

FIG. 4 illustrates an example of a videotelephony system 400. In particular embodiments, the systems, methods, and processes as described in this disclosure may be embodied or implemented on a videotelephony platform (e.g., a videotelephony system 400). In particular embodiments, the videotelephony system 400 may include two or more communication devices (e.g., 410 and 420) that are connected through a communication network 419. The communication device 410 may include two cameras 411 and 412, a display 413, one or more processors, memory, data storage media, etc. The communication device 420 may include two cameras 421 and 422, a display 423, one or more processors, memory, and data storage media, etc. A communication device may serve as a sender-side device or/and receiver-side device. The sender-side device may capture video/audio data for the sender-side scene and send the captured video/audio data to a receiver-side device. The receiver-side device may receive video/audio data from the sender-side device and display output images generated based on the viewer's viewpoint relative to the receiver-side display. For example, the communication device 420 may serve as a sender-side device that captures and sends the video to the communication device 410 which serves as a receiver-side device. In particular embodiments, the videotelephony system may be a unidirectional system where a first communication device serves as the sender-side device and a second communication device servers as the receiver-side device. In particular embodiments, the videotelephony system may be a bidirectional system where the two communication devices may serve as a sender-side device and a receiver-side device simultaneously. In particular embodiments, to allow the receiver-side device to display video with head-motion parallax effect, the sender-side device may include at least two cameras arranged at different positions or at least one camera and a depth sensor. The receiver-side device may include at least one sensor or camera to track the viewpoint of the viewer (e.g., a heal position, eye positions, a center point of two eyes).

In particular embodiments, a videotelephony system may include at least one sender-side device and at least one receiver-side device communicating through a communication network. The sender-side device may include at least two cameras (e.g., RGB cameras) that are arranged at different positions of the sender-side device. These cameras may have overlapping fields of view (FOVs) and may be synchronized to capture video streams of the scene falling within the overlapping FOV area from different perspectives. For example, the sender-side device may have two cameras that are arranged at two different positions of the sender-side device along one dimension. These two cameras may be synchronized to simultaneously capture images of a scene from two different view angles corresponding to the two camera positions. In this disclosure, the simultaneously captured images may refer to images that are captured at substantially the same time by different cameras. In particular embodiments, the sender-side device may compress the captured video streams and send the compressed video streams to the receiver-side device. The sender-side device may also send the corresponding metadata that includes extrinsic properties (e.g., intrinsic and extrinsic camera properties including position information) of the sender-side cameras that are used for capturing these video streams. In particular embodiments, the extrinsic camera properties may include the camera's setup, such as, for example, camera pose, camera positions, and the distance between two cameras (the baseline). Intrinsic properties may include lens characteristics, distortion, etc. The receiver-side device may receive the compressed video data and corresponding metadata, un-compress them, and render and display the video to the viewer with the head-motion parallax effect. For example, the receiver-side device may include a head tracking system (e.g., a camera, a head tracking sensor, or eye-tracking sensor) for tracking the head position (or eye position) of the viewer. The receiver-side device may use the head tracking system or eye-tracking system to determine the viewpoint of the viewer with respect to the display of the receiver-side device. In particular embodiments, a viewpoint of the viewer may be a head position, an eye position, a center position of the viewer's two eyes, a reference point associated with the viewer, etc. Then, the receiver-side device may generate a series of output images according to the viewpoint of the viewer and display the generated output images on a display. As a result, when the view angle or viewpoint of the viewer changes with respect to the receiver-side display, different perspectives of the sender-side scene may be displayed to the viewer according to the viewpoint of the viewer leading to a head-motion parallax effect, as if the viewer is looking at the scene in the real world. The head-motion parallax effect may be achieved even if the receiver-side device uses a traditional monoscopic display.

Figure 5A:
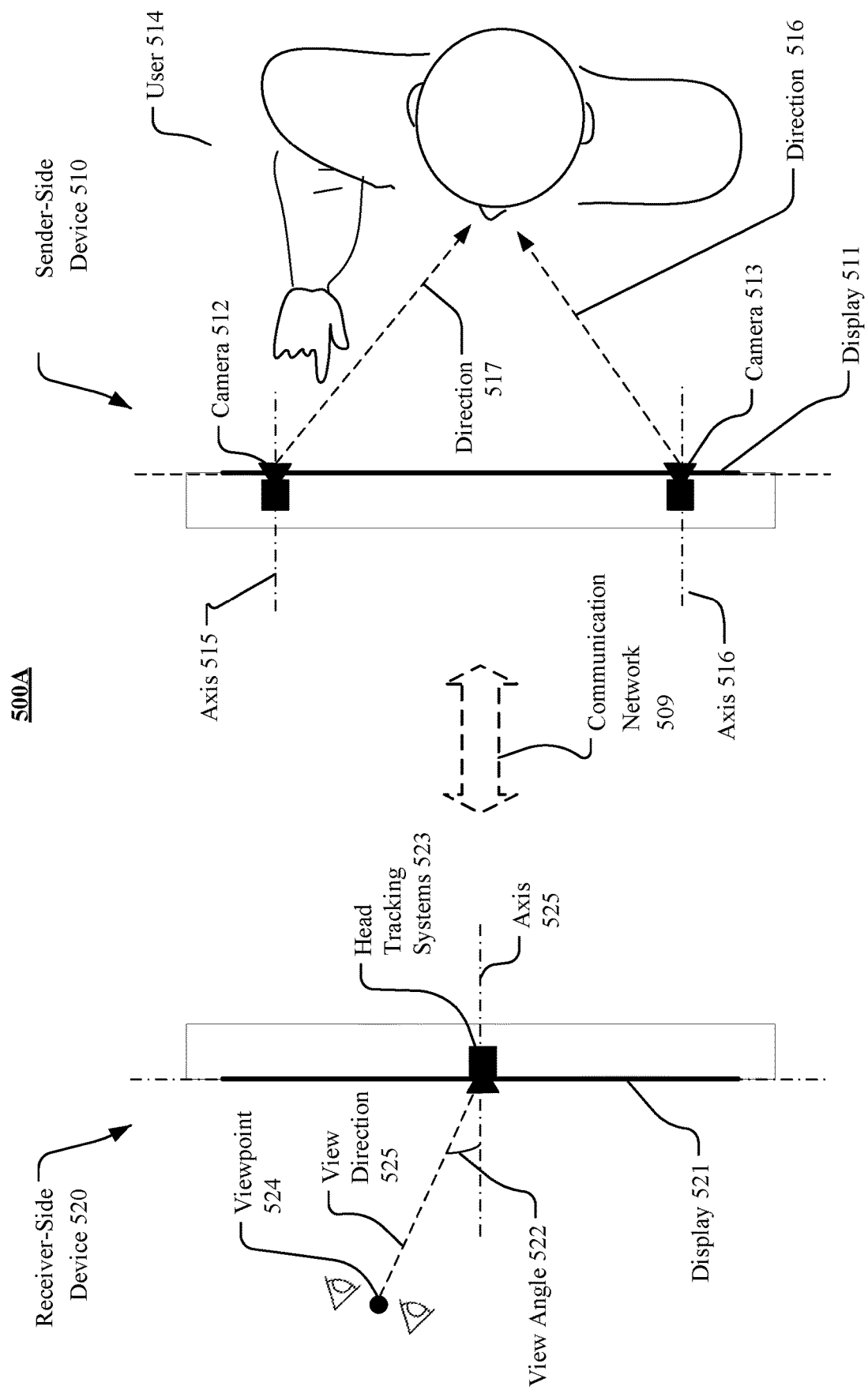
FIG. 5A illustrates an example unidirectional videotelephony system which is capable of displaying videos with head-motion parallax along one dimension.

FIG. 5A illustrates an example unidirectional videotelephony system 500A which is capable of displaying videos with head-motion parallax along one dimension. As an example and not by way of limitation, the unidirectional videotelephony system 500A may include a sender-side device 510 and a receiver-side device 520. The sender-side device 510 may include two cameras 512 and 513 that are arranged at different positions of the sender-side device 510 along one dimension parallel to the surface of the display 511. The receiver-side device 520 may include a display 521 and a head tracking system 523 (e.g., a camera, a head tracking sensor, an eye-tracking sensor). The sender-side device 510 and the receiver-side device 520 may communicate through the communication network 509. At run time, a user 514 of the sender-side device 510 may be in front of the sender-side device 510 and fall within the overlapping areas of the FOVs of the cameras 512 and 513. The sender-side device 510 may use the camera 512 to capture images of the sender-side scene (including the user 514 and all other objects within the camera's field of view) from a first perspective corresponding to a first direction 517. The sender-side device 510 may use the camera 513 to capture images of the scene (including the user 514 and all other objects within the camera's field of view) from a second perspective corresponding to a second direction 516. The cameras 512 and 513 may be synchronized with each other in time so that the images of different perspectives of the same scene (i.e., at a particular time moment) may be captured simultaneously (i.e., substantially the same time).

In particular embodiments, the sender-side device 510 may generate data packets containing (1) image data related to a series of image pairs (each image pair including a first image for the first perspective and a second image for the second perspective that is captured substantially at the same time) or (2) metadata containing extrinsic properties of the cameras 512 and 513 (e.g., intrinsic or extrinsic camera position information of the cameras 512 and 513). The sender-side device 510 may compress these data packets and transmit the compressed data packets to the receiver-side device 520 through the communication network 509. The receiver-side device 520 may receive the compressed data packets from the sender-side device 510, uncompressed them, render and display output images with head-motion parallax effect on the display 521. In particular embodiments, the sender-side device 510 may send two video streams that are captured by the two cameras 512 and 513 to the sender-side device 520. The two video streams may contain correspondence data that associates the first frame in the first video stream to a corresponding frame in the second video stream that is captured simultaneously to the first frame. The receiver-side device 520 may use the head tracking system 523 (or an eye-tracking system) to determine the viewpoint 524 of the viewer at the receiver-side device 520. The viewpoint 524 of the viewer may correspond to the center point of the viewer's two eyes 524 or a head position of the viewer. The receiver-side device 520 may determine the viewer's view direction 525 with respect to the display 521 of the receiver-side device 520 or/and the view angle 522 of the viewer with respect to the axis 525 perpendicular to the display 521. Then, for displaying the scene of a particular time moment, the receiver-side device 520 may generate an output image based on: (1) a first image that was captured by the first camera 512 from the first perspective, (2) a second image that was captured by the second camera 513 from the second perspective simultaneously to capturing the first image, and the view angle 522 of the viewer at this time moment. The generated output image may reveal a particular perspective of the scene according to the current view angle 522 of the viewer as if the viewer is looking at the scene in the real world.

Figure 5B:
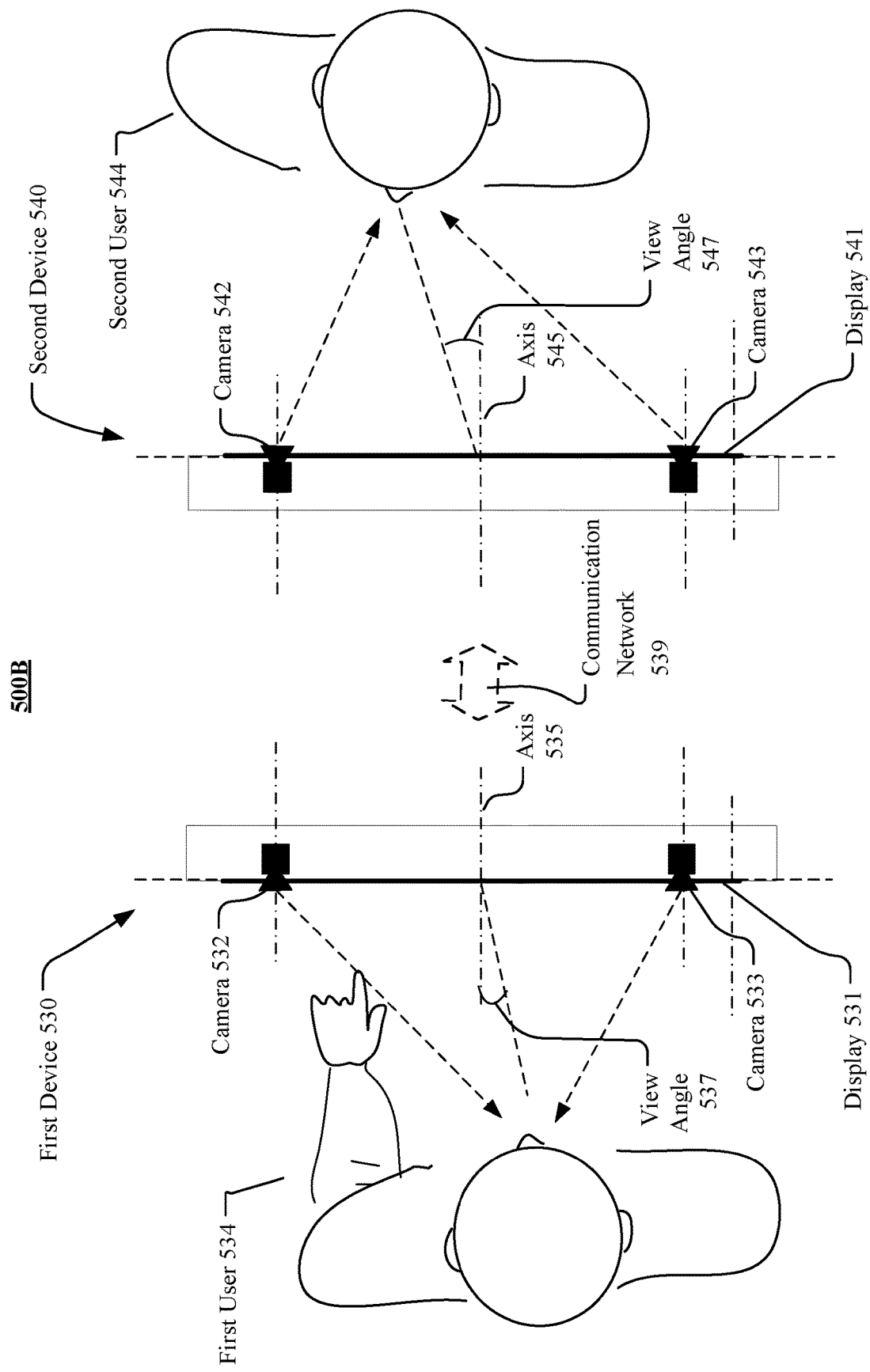
FIG. 5B illustrates an example bidirectional videotelephony system that is capable of displaying videos with head-motion parallax simultaneously for both sides.

FIG. 5B illustrates an example bidirectional videotelephony system 500B that is capable of displaying videos with head-motion parallax simultaneously for both sides. In particular embodiments, the videotelephony system may include two bidirectional communication devices that communicate with each other through a communication network. Each communication device may serve as both a sender-side device and a receiver-side device concurrently. The videotelephony system may be capable of displaying videos with head-motion parallax for both sides of devices concurrently. As an example and not by way of limitation, the videotelephony system 500B may include a first communication device 530 and a second communication device 540 communicating with each other through the communication network 539. The first communication device 530 may include at least two cameras (e.g., 532 and 533) arranged at different positions. These cameras may have overlapping fields of view (FOVs) and may be synchronized to capture images of the scene in the overlapping area of the camera FOVs from different perspectives. In particular embodiments, the first communication device 530 may use the cameras (e.g., 532 and 533) or a head tracking system (or eye tracking system) to track the head position of the first user 534. The second communication device 540 may include at least two cameras (e.g., 542 and 543) arranged at different positions. These cameras (e.g., 542 and 543) may have overlapping fields of view (FOVs) and may be synchronized to capture images of the scene within the overlapping area of the camera FOVs from different perspectives. The second communication device may use these cameras (e.g., 532 and 533) or a head tracking system (or an eye-tracking system) to track the head position of the second user 544.

At run time, the first communication device 530 may use the cameras 532 and 533 to capture two video streams containing images of the first user 534 (including all other objects and background within the overlapping FOV area) that are captured from two different perspectives and at substantially the same time. Then, the first communication device 530 may send the captured video streams to the second communication device 540 together with the camera position information (e.g., intrinsic and extrinsic camera position information) of the cameras 532 and 533. The second communication device 540 may determine the viewpoint (e.g., a center point of two eyes) of the second user 544 using a head tracking system, an eye-tracking system, or the cameras 542 and 543. The second communication device 540 may generate output images based on: (1) the viewpoint of the second user 544 and (2) corresponding images of the first user 534 that are simultaneously captured from different perspectives. Then, the second communication device 540 may display the output images on the display 541 to the second user 544. The output images may show a particular perspective of the first user 534 corresponding to the viewpoint or view angle 545 of the second user 544. As a result, the video streams displayed to the second user 544 may have a head-motion parallax effect. In other words, when the head position of the second user 544 changes with respect to the display 541, the images displayed to the second user 544 may show different perspectives of the first user 534 as if the second user is looking at the first user 534 in the real world.

Concurrently, the second communication device 540 may use the cameras 542 and 543 to capture two video streams containing images of the second user 544 (including all other objects and background within the overlapping FOV area) that are captured from two different perspectives and simultaneously (at substantially the same time). Then, the second communication device 540 may send the captured video streams to the first communication device 530 together with the camera position information for the cameras 542 and 543. The first communication device 530 may determine the viewpoint of the first user 534 (e.g., using a head tracking system, an eye-tracking system, or the cameras 532 and 533) and generate output images based on: (1) the viewpoint of the first user 534 and (2) corresponding images of the second user 544 that are captured from different perspectives. Then, the first communication device 530 may display the output images on the display 531 to the first user 534. The output images may show a particular perspective of the first user 534 corresponding to the viewpoint or view angle 537 of the first user 534. As a result, the video streams displayed to the first user 534 may have a head-motion parallax effect to the first user 534. In other words, when the head position of the first user 534 changes with respect to the display 531, the images displayed to the first user 534 may show different perspectives of the second user 544 as if the first user 534 is looking at the second user 544 in the real world.

In particular embodiments, if the sender-side device has two cameras, the sender-side device may be limited to capture images from two perspectives along one dimension corresponding to a line crossing the two camera positions. For example, if the two cameras are arranged at positions along a horizontal line, the cameras may capture images from two perspectives along the horizontal direction. And, the head-motion parallax effect on the receiver-side device may be limited to the horizontal direction. As another example, if the two cameras are arranged at positions along a vertical line, the cameras may capture images from two perspectives along the vertical direction. And, the head-motion parallax effect on the receiver-side device may be limited to the vertical direction. However, in particular embodiments, the sender-side device may include two cameras arranged along a diagonal line with respect to the scene or a display of the sender-side device. The two cameras arranged along the diagonal direction may capture images that include perspective information along both the vertical and horizontal directions and allow the receiver-side device to generate and display video with head-motion parallax along two dimensions.

Figure 5C:
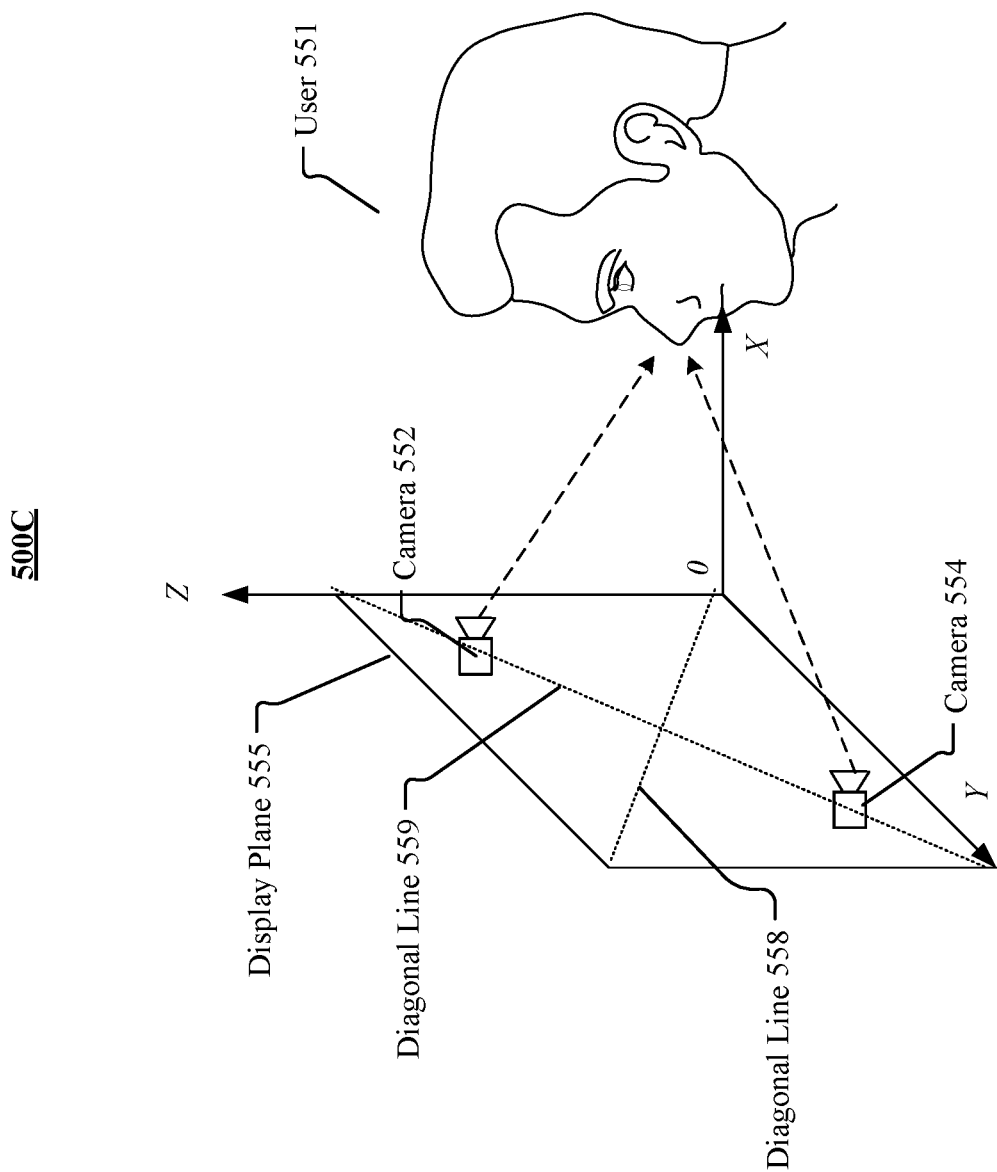
FIG. 5C illustrates an example configuration for using two sender-side cameras to achieve head-motion parallax along two dimensions.

FIG. 5C illustrates an example configuration 500C for using two sender-side cameras to achieve head-motion parallax along two dimensions. As an example and not by way of limitation, the sender-side device may have its display plane 555 being aligned with the Z-Y plane in the three-dimensional space. The two cameras 552 and 554 may be arranged at two positions along the diagonal line 559 of the display plane 555 and may be synchronized to capture images of the user 551 from two angles along the diagonal line 559. These image data and the camera position information data may be sent to a receiver-side device for rendering video with head-motion parallax. When the viewer's viewpoint moves along the horizontal or vertical direction, the images may be generated based on the corresponding two perspective images captured by the two cameras 552 and 554 and according to the viewpoint of the viewer. As a result, the displayed images to the viewer may show different perspectives of the user 551 according to the viewpoint of the viewer at the receiver side. It is notable that the head-motion parallax effect achieved by using two diagonally arranged cameras may depend on the moving direction of the viewer's head. For example, when the viewer's head moves along a direction corresponding to the diagonal line 559, the head-motion parallax effect may be one-dimensional head-motion parallax (e.g., as discussed in the earlier sections of this disclosure). As another example, when the viewer's head moves along a direction corresponding to the diagonal line 558, the rendered video may not show any head-motion parallax effect. As yet another example, when the viewer's head moves along the horizontal or vertical direction, the rendered video may show some degree of head-motion parallax effect even it may be less optimal than the effect achieved by the confirmation using three or more cameras (as will be discussed in later sections).

Figure 5E:
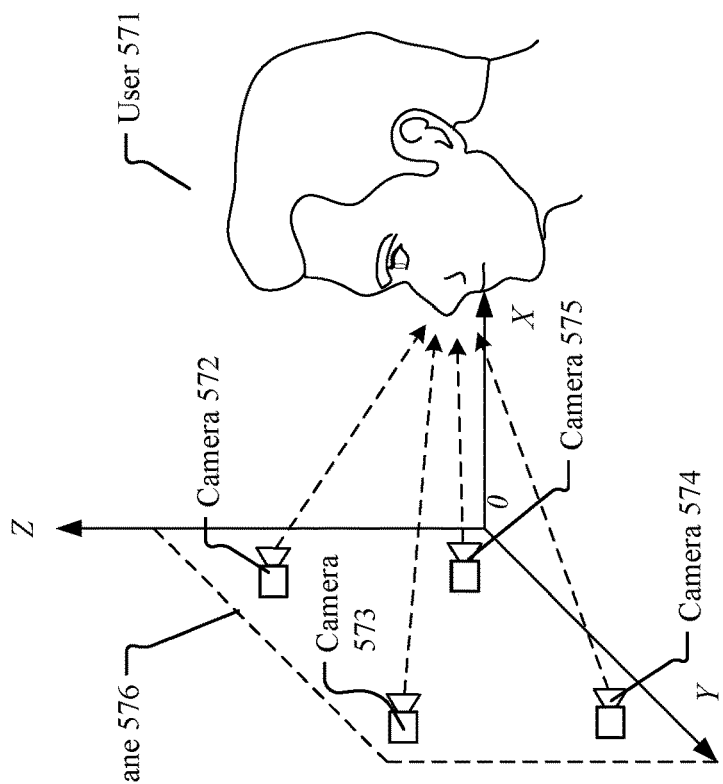
FIG. 5E illustrates an example configuration using four cameras to capture images from different perspectives.
Figure 5D:
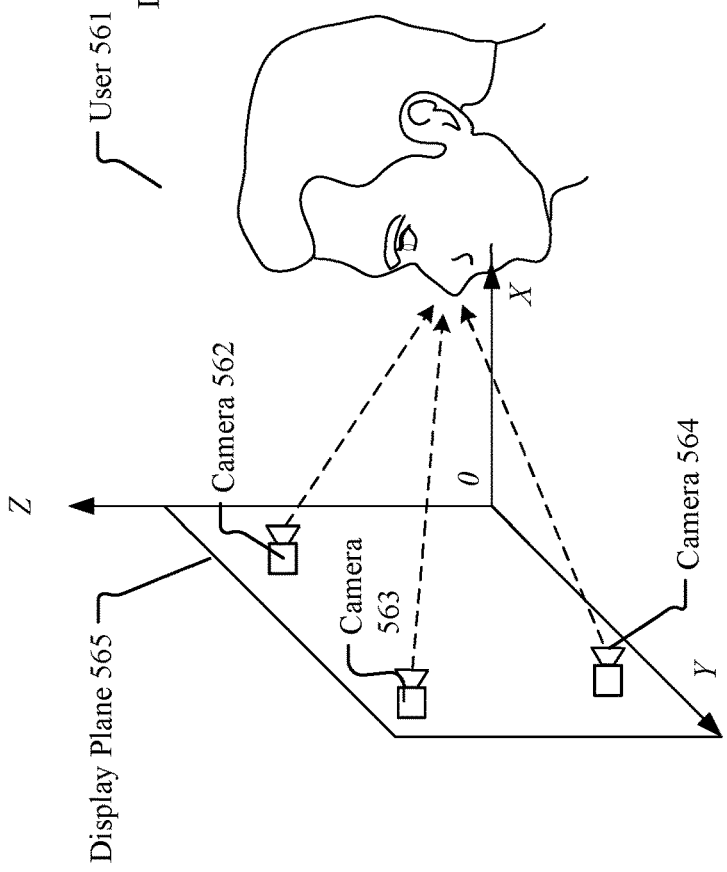
FIG. 5D illustrates an example configuration using three cameras to capture images from different perspectives

FIG. 5D illustrates an example configuration 500D using three cameras to capture images from different perspectives. As an example and not by way of limitation, the receiver-side device may have its display plane 565 being aligned with the Z-Y plane in the three-dimensional space. Three cameras 562, 563, and 564 may be arranged at different positions forming a 2D plane (e.g., arranged at three vertexes of a triangle) to capture images of the user 561 from three different perspectives. These images and the camera position information may be sent to a receiver-side device for rendering video with head-motion parallax. When the head of a viewer at the receiver-side device moves along the horizontal or/and vertical direction, the output images may be generated based on the corresponding three perspective images captured by the cameras 562, 563, and 564 and according to the viewpoint of the viewer. As a result, the displayed images to the viewer may show different perspectives of the user 561 according to the viewpoint of the viewer. It is notable that the three camera positions as shown in FIG. 5D are for example purpose only and the camera's positions are not limited thereto. For example, the camera positions may be any suitable positions that form a 2D plane.

FIG. 5E illustrates an example configuration 500E using four cameras to capture images from different perspectives. As an example and not by way of limitation, the receiver-side device may have its display plane 576 being aligned with the Z-Y plane in the three-dimensional space. Four cameras 572, 573, 574, and 575 may be arranged at four vertexes of a rectangle to capture images of the user 571 from four different perspectives. The image data and the camera position information may be sent to a receiver-side device for rendering video with head-motion parallax effect. When the head of a viewer at the receiver-side device moves along the horizontal or/and vertical direction, output images may be generated based on the corresponding four perspective images captured by the cameras 572, 573, 574, and 575 and according to the viewpoint of the viewer. As a result, the displayed images to the viewer may show different perspectives of the user 571 according to the viewpoint of the viewer. It is notable that the camera configuration illustrated in FIG. 5E is for example purpose only and the videotelephony system is not limited thereto. For example, the videotelephony system may include any suitable number of cameras (e.g., an array of cameras) that may be arranged in any suitable positions for capturing images from different perspectives along two dimensions (e.g., two perpendicular dimensions).

In particular embodiments, the receiver-side device may use an image-based rendering method to generate an output image directly based on the two perspective images and the view angle of the viewer (without using a 3D model). For example, a pixel value in the output image may be determined based on a weighted average of a first pixel in the first perspective image and a second pixel in the second perspective image. The first and second pixels may correspond to each other and be associated with the same feature of the scene (e.g., the nose of the user). In particular embodiments, the receiver-side device may use a geometric model to generate an output image based on the two perspective images and the viewpoint of the viewer. A pixel value in the output image may be determined by casting rays from the viewpoint of the viewer to the geometric model and sampling corresponding RGB image(s) associated with the visible portions of the geometric model for determining texture. In particular embodiments, the receiver-side device may generate the output images based on corresponding perspective images and a point cloud of the scene and the current viewpoint of the viewer. In particular embodiments, the output images may be generated by the receiver-side device or the sender-side device depending on the available resources of each device and the configuration of the videotelephony system. After the output image is generated, the receiver-side device may display the output image on the display to the viewer. The receiver-side device may repeat this rendering and displaying process to generate and display a video stream on the display to the viewer. Each image of the video stream may be generated based on a corresponding viewpoint of the viewer. As a result, when the viewpoint of the viewer changes with respect to the display of the receiver-side device, different perspectives of the scene may be revealed to the viewer, and the displayed video may appear to have a head-motion parallax effect even the receiver-side device uses a traditional monoscopic display.

Figure 6A:
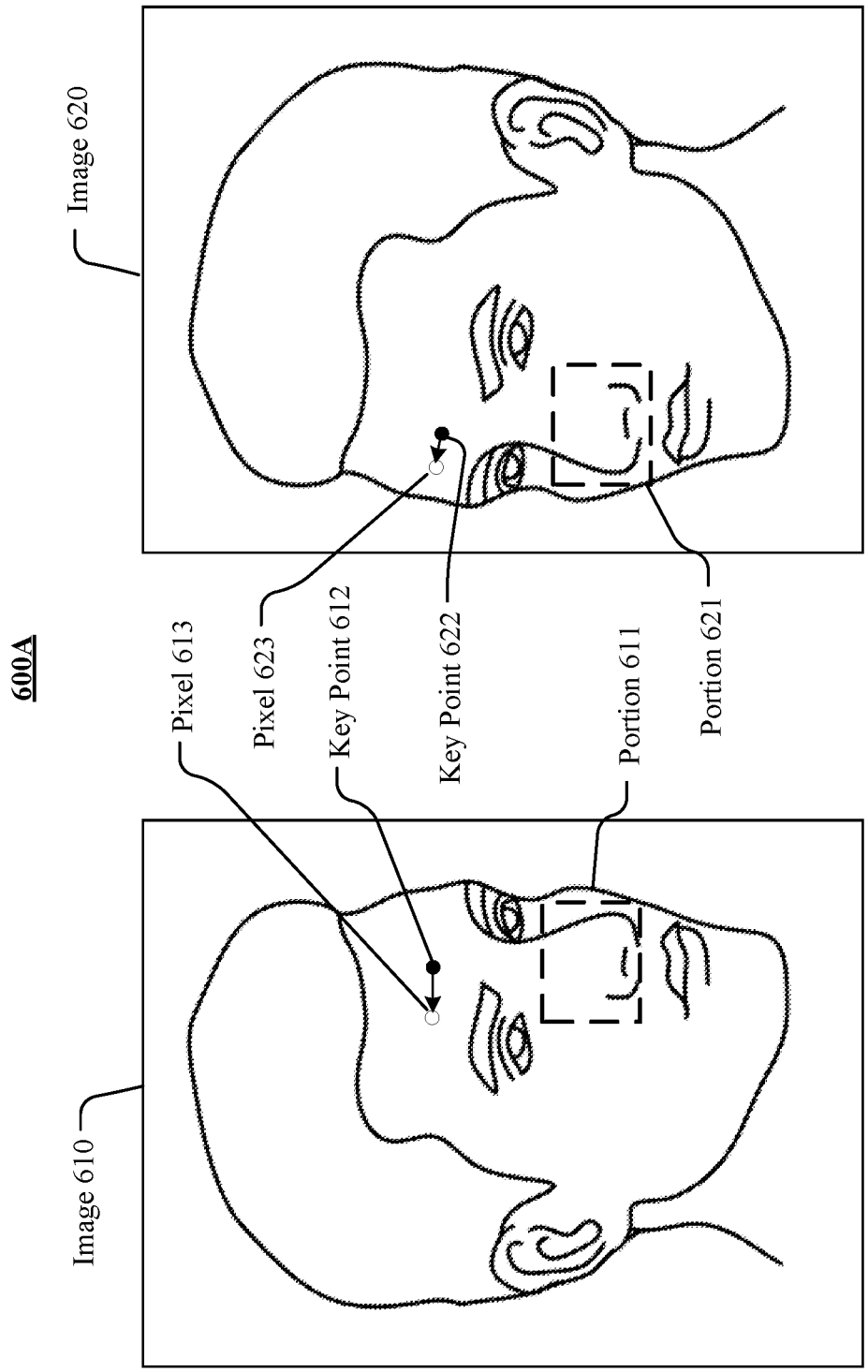
FIG. 6A illustrates an example process for matching features in images captured from different perspectives.

FIG. 6A illustrates an example process 600A for matching features in images captured from different perspectives. In particular embodiments, the videotelephony system may use an image-based rendering (IBR) method to fuse or blend images that are captured simultaneously by the sender-side cameras from different perspectives to generate video with head-motion parallax effect. In particular embodiments, the feature matching and output image rendering operations may be performed by the receiver-side device. For example, the sender-side device may send (1) the images that are captured simultaneously from different perspectives and (2) the corresponding camera position information to the receiver-side device. The receiver-side device may find correspondences between the frames that are captured simultaneously by the sender-side cameras by matching corresponding features (e.g., nose, eyes, ears, chin, objects) in these frames. As an example and not by way of limitation, the receiver-side device may receive two images of 610 and 620 for a particular time moment of the sender-side scene. The two images 610 and 620 may be captured at different angles and show different perspectives of the sender. The receiver-side device may use image processing algorithms (e.g., object recognition algorithms, feature recognition algorithms, machine-learning models) to identify features (e.g., eyes, nose, mouth, forehead, etc.) in each image. Then, the receiver-side device may match the identified features in one image to the identified features in the other image to determine the correspondence of the image portions.

For example, the image portion 611 in the image 610 may be identified as being associated with the nose of the sender. The image portion 622 in the image 620 may be identified as being associated with the nose of the sender. The receiver-side device may identify a correspondence relationship between the image portion 611 and the image portion 622. The receiver-side device may repeat this process to identify all image portions in respective images that are associated with the same feature and therefore correspond to each other. The corresponding image portions may be blended or fused to generate the output image, as will be discussed in later sections of this disclosure. During the blending process, the pixel values within an output image portion may be determined by the corresponding image portions in the perspective images collectively. In particular embodiments, the output image rendering process including the feature matching may be performed by the sender-side device using the same principle and process as described herein. In particular embodiments, the feature matching may be processed by one or more machine-learning models that are trained to identify and match features in images captured from different perspectives. It is notable that the feature matching process involving two images is used for example purpose only and the methods, principles, and processes as described here are not limited to two perspective images. For example, the methods, principles, and process may be appliable to any suitable number of images captured from different perspectives.

In particular embodiments, the videotelephony system may use a key-point matching method to determine the correspondence between the pixels of the images captured from different perspectives. As an example and not by way of limitation, the system (e.g., by a receiver-side device or a sender-side device) may use computer algorithms (e.g., object recognition algorithms, feature recognition algorithms, machine-learning models) to process the image 610 to identify a number of features in the image 610 (e.g., eyes, nose, mouth, forehead, etc.). Then, the system may determine a number of key points (e.g., 612) including, for example, but not limited to, a center of an eye, a center of the forehead, an eyebrow tip, etc. Then, the system may process the image 620 to identify a number of features in the image 620 and determine a number of key points (e.g., 622) for the features including, for example, but not limited to, a center of an eye, a center of the forehead, an eyebrow tip, etc. The system may determine the correspondence between two key points (e.g., 612 and 622) that are associated with the same features (e.g., the center of the forehead) and are within two respective images. The system may determine a number of key-point pairs (e.g., 612 and 622) each including two key points that correspond to each other. Then, the system may determine the correspondence between the pixels (e.g., 613 and 623) of the two images 610 and 620 based on the corresponding key points (e.g., 612 and 622).

For example, for the pixel 613 which is close to the key point 612, the system may determine a distance metric with respect to that particular key point. The distance metric may be a computed distance of the pixel 613 to the associated key point 612 as measured along an associated feature (e.g., a curve distance over a feature curve, a surface distance over a feature surface). Then, the system may identify the corresponding pixel 623 based on a determination that the pixel 623 has the same computed distance metric (which is not the image pixel distance) with respect to the key point 622 which corresponds to the key point 612. Similarly, the system may repeat this process to determine a number of corresponding pixels in the two images of 610 and 620 and determine the pixel values in the input images based on the corresponding pixels in the two images of 610 and 620. A pixel value in the output image may be determined based on a weighted average of the corresponding pixels in the two perspective images. The weight or blending proportions may be determined based on the viewpoint of the viewer with respect to the boundary view angles for the head-motion parallax effect. It is notable that some pixels in the first image 610 may not have corresponding pixels in the second image 620 because the corresponding portion of the face may be within the hidden side. In that scenario, the corresponding pixel value in the output image may be determined based on the corresponding pixel in the first image 610 only. Similarly, some pixels in the second image 620 may not have corresponding pixels in the first image 610 because the corresponding portion of the face may be within the hidden side. In that scenario, the corresponding pixel value in the output image may be determined based on the corresponding pixel in the second image 620 only. In particular embodiments, the pixel matching may be processed by one or more machine-learning models that are trained to identify and match key points and corresponding pixels in images that are captured from different perspectives. In particular embodiments, the system may use the key-point based pixel matching method in addition to the image portion matching method after the image portion correspondence have been determined. In particular embodiments, the system may use the key-point based pixel matching method directly (without using the image portion matching method). It is notable that the pixel-matching process involving two images is used for example purpose only and the methods, principles, and processes as described here are not limited to processing two images. For example, the methods, principles, and process may be appliable to any suitable number of images.

In particular embodiments, the system may use the image-based rendering method to generate the output image by blending or fusing the corresponding image portions of the images captured from different perspectives. As an example and not by way of limitation, the system may determine the pixel values for an image portion of the output image associated with the sender's nose by blending the image portion 611 in the first image 610 and the image portion 621 in the second image 620 according to blending proportions computed based on the viewpoint of the viewer. The system may determine a pixel value in the output image portion based on a weighted average of corresponding pixels of corresponding image portions 611 and 621 in the images 610 and 620. The blending proportions corresponding to the weight values may be determined based on the viewpoint of the viewer (e.g., a head position or a center position of the eyes) with respect to the receiver-side display. For example, the blending proportions may be determined based on a calculated proportion of the view angle of the viewer with respect to the boundary angles for the head-motion parallax effect. Then, the receiver-side device may display the output images to the viewer. When the viewer's head position changes with respect to the receiver-side display, the output images displayed to the viewer may reveal different perspectives of the scene captured by the sender's cameras and may appear as if the viewer is looking at the object (e.g., the sender's face) in the scene in the real world.

Figure 6B:
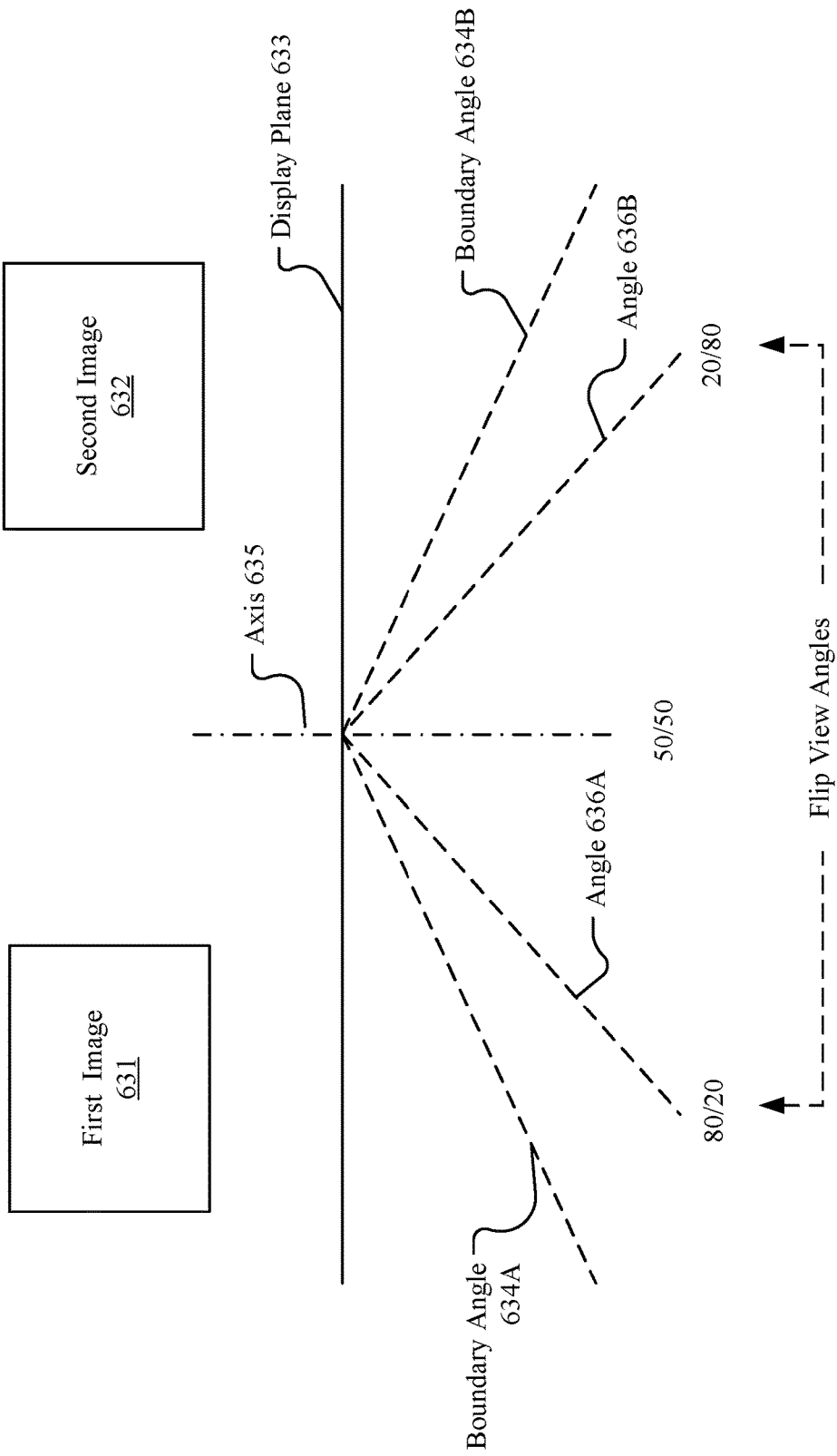
FIG. 6B illustrates an example process for determining blending proportions based on the view angle of the viewer and corresponding boundary angles for a parallax effect.

FIG. 6B illustrates an example process 600B for determining blending proportions based on the view angle of the viewer and corresponding boundary angles for the parallax effect. As an example and not by way of limitation, the system may have a first image 631 that is captured by a sender-side camera on the left side and a second image 632 that is captured by a sender-side camera on the right side. The system may determine a first boundary angle 634A and a second boundary angle 634B defining a view angle range for the head-motion parallax effect. The boundary angles 634A and 634B may be determined based on sender-side camera positions and camera FOVs with respect to the sender-side scene. The system may support the head-motion parallax effect when the view angle of the viewer falls within the view angle range as defined by the boundary angles 634A and 634B. The first boundary angle 634A may correspond to the first image 631 and the second boundary angle 634B may correspond to the second image 632. When the viewer views the display from the first view angle 634A, the receiver-side device may display the first image 631. When the viewer views the display from the second view angle 634B, the receiver-side device may display the second image 632. It is notable that, for one-dimensional parallax, the view angle range may correspond to a one-dimensional angle range on a 2D plane, and for two-dimensional parallax, the view angle range may correspond to a conical volume in the 3D space.

In particular embodiments, when the view angle of the viewer falls within the angle range defined by the boundary angles, the system may calculate the pixels values of the generated image according to the current view angle using the following equation:

$$p = p_1 \times x\% + p_2 \times (1-x\%) \tag{1}$$

where p is a pixel value in the generated image, $p_1$ is the corresponding pixel value in the first perspective image, $p_2$ is the corresponding pixel value in the second perspective image, x % is a percentage value determined based on the viewer's view angle and the two pre-determined boundary angles of the view angle range that supports the head-motion parallax effect. In particular embodiments, the corresponding pixels for the pixel values of $p_1$ and $p_2$ may be associated with the same portion of the same features in the scene (e.g., nose, eyes, face, etc.). In particular embodiments, the percentage value may be determined by the following equation:

$$x\% = (\beta - \beta_2) \times 100 / (\beta_1 - \beta_2) \tag{2}$$

where β is the current view angle of the viewer, $\delta_1$ is the first boundary angle of the view angle range, and $\beta_2$ is the second boundary angle of the view angle range.

As an example and not by way of limitation, when the view angle of the viewer falls within the view angle range as defined by the first and second view boundary angles 634A and 634B, the system may calculate a blending proportion value based on the relative proportion of the viewer's view angle with respect to the two boundary angles 634A and 634B. For example, when the viewer views the display at the view angle 636A, the system may determine that the blending proportion is 80/20. The system may determine a pixel value in the output image using 80% of a first corresponding pixel value in the first image 631 and 20% of a second corresponding pixel value in the second image 632. As another example, when the viewer views the display at the view angle 636B, the system may determine that the blending proportion is 20/80. The system may determine a pixel value in the output image using 20% of a first corresponding pixel value in the first image 631 and 80% of a second corresponding pixel value in the second image 632. As another example, when the viewer views the display along the axis 635 that is perpendicular to the display plane 633, the system may determine that the blending proportion is 50/50. The system may determine a pixel value in the output image using 50% of a first corresponding pixel value in the first image 631 and 50% of a second corresponding pixel value in the second image 632.

In particular embodiments, the system may flip the viewpoint or view angle of the viewer during the image blending process to generate a different visual effect where the sender's face may appear to follow the viewer when the viewer's viewpoint moves with respect to the receiver-side display. As an example and not by way of limitation, as illustrated in FIG. 6B, the system may flip the view angle of the viewer from the view angle 636A to the view angle 636B which is symmetric to the view angle 636A around the axis 635. When the viewer views the display from the angle 636A, the system may use the blending proportion of the view angle 636B, which is 20/80, rather than the blending proportion of the view angle 636A, which is 80/20, for blending the corresponding image portions. Similarly, when the viewer views the display from the angle 636B, the system may use the blending proportion of the view angle 636A, which is 80/20, rather than the blending proportion of the view angle 636B, which is 20/80, for blending the corresponding image portions. The output images may be generated by blending image portions according to a flipped view angle of the current view angle of the viewer. As a result, the output images may reveal different perspectives of the sender's face to the viewer when the viewer's viewpoint or view angle changes with respect to the display, and the sender's face may appear to follow the motion of the viewer's viewpoint (different from the head-motion parallax effect).

In particular embodiments, the sender-side device may include three or more cameras that are arranged at different positions and synchronized to capture video streams containing images of different perspectives of the scene. The camera positions may be arranged in a way that allows these cameras to capture different perspectives of the scene along at least two perpendicular dimensions. The sender-side device may not arrange all cameras along one dimension (that would limit the cameras to capture perspectives along one dimension only) and may have at least one camera whose position is not aligned to other cameras along one dimension. In particular embodiments, the sender-side cameras may be arranged at different positions that form a 2D plane. Assuming the sender-side device includes N number of cameras (e.g., N=2, 3, 4, or any suitable integers), the system may have N number images that are captured simultaneously from different perspectives for the scene of a particular time moment. The system may feed all these perspective images to the fusion algorithm to generate the output image according to the view angle or viewpoint of the viewer. In particular embodiments, the system may generate the image to be displayed to the viewer based on the following equation:

$$p = \Sigma_1^N p_i \cdot x_i \% \quad (3)$$

where p is a pixel value in the generated image, $p_i$ is the pixel value of a corresponding pixel in the i-th perspective image, $x_i$ is a weight value in percentage for the pixel value $p_i$. The weight value $x_i$ may be determined based on the camera position of the corresponding i-th camera, the relative position of the i-th camera to other cameras, and the view angle or viewpoint of the viewer. The following constraints may be applicable to the weight value $x_i$:

$$1 = \Sigma_1^N x_i \% \quad (4)$$

The viewer's viewpoint may be determined with respect to the display of the receiver-side device and may contain view angle information along two perpendicular dimensions.

By fusing the images based on the corresponding camera positions and the viewpoint of the viewer, the system may generate a video stream that has a two-dimensional head-motion parallax effect. In other words, when the viewpoint of the viewer changes in the 3D space (e.g., along two perpendicular dimensions), the video stream displayed by the receiver-side device may reveal different perspectives of the scene (e.g., different sides of the sender's face) along two perpendicular dimensions according to the viewer's viewpoint. As a result, the video stream displayed on the receiver-side device may appear to be more realistic and natural to the viewer with the head-motion parallax effect. In particular embodiments, the sender-side device may include an array of cameras for capturing images from different perspectives. In general, with more cameras on the sender-side device, the system may achieve a better head-motion parallax effect with more realistic and natural visual results. In particular embodiments, the system may use a process that is similar to linear interpolation, bilinear interpolation, or trilinear interpolation to generate the rendered image based on (1) an array of perspective images that are captured by corresponding cameras, and (2) corresponding camera position information.

Figure 6C:
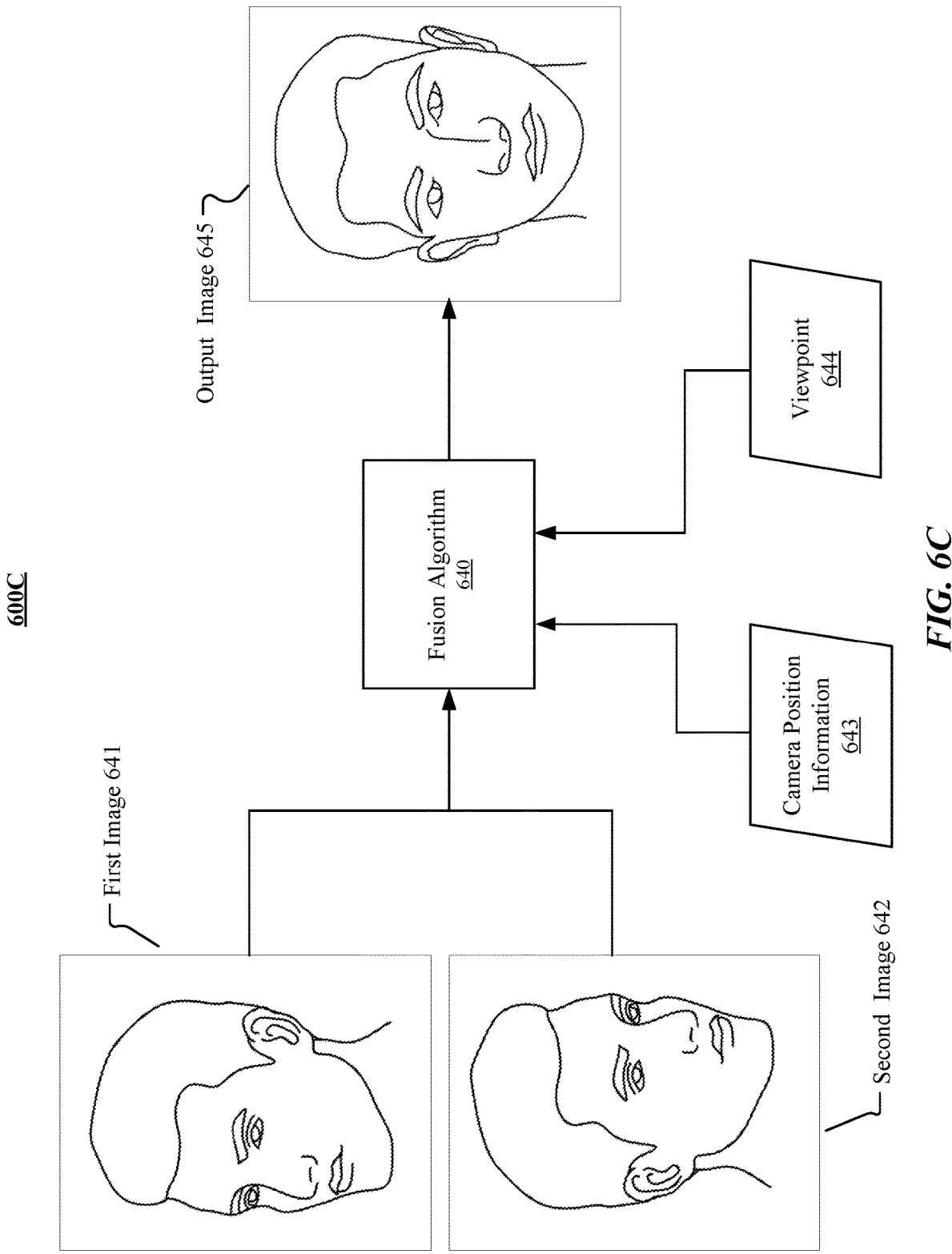
FIG. 6C illustrates an example image-based rendering method for generating output images according to the viewer's viewpoint.

FIG. 6C illustrates an example image-based rendering method 600C for generating output images according to the viewer's viewpoint. In particular embodiments, the system may use a fusion algorithm 640 to fuse or blend two or more perspective images (e.g., 641 and 642) based on: (1) the camera position information 643 of the sender-side device and (2) the viewpoint 644 of the viewer at the receiver-side device. When the sender-side device has two cameras, the two cameras may capture two video streams containing image pairs or image groups of the scene that are captured from two perspectives and captured at substantially the same time. The images of the same image pair or group may be associated with each other by tags or other indicating information in the video streams. To generate an output image for a particular time moment of the scene, the system may feed the corresponding group of images (e.g., 641 and 642), the camera position information 643, and the viewpoint 644 of the viewer to the fusion algorithm 640. The fusion algorithm 640 may generate the output image 645 for that particular time moment by fusing or blending the two images (e.g., 641 and 642) together using the processes and methods as described in this disclosure.

In particular embodiments, the fusion algorithm 640 may first determine the correspondence between these perspective images (e.g., 641 and 642) by matching the features (e.g., nose, eyes, ears, chin, objects) in the images and identify the correspondence between pixels that are associated with the same feature (e.g., using the processes and methods as described in earlier sections of this disclosure). The fusion algorithm may fuse or blend the perspectives (e.g., 641 and 642) images to generate the output image by blending the corresponding images portions in these perspective images according to the blending proportions computed based on the viewpoint of the viewer. Then, the fusion algorithm 640 may determine the pixel values for the generated image based on a weighted average of pixel values of the corresponding pixels in the perspective images (e.g., using the processes and methods as described in earlier sections of this disclosure). The weight values corresponding to the blending proportions may be determined based on the viewpoint of the viewer and the boundary angles for the parallax effect. It is notable that the fusion algorithm illustrated in FIG. 6C uses two input images (of different perspectives) for example purpose and the systems, methods, and processes are not limited thereto. For example, the fusion algorithm may have any suitable number (e.g., 2, 3, 4, 5, etc.) of input images of different perspectives. When the fusion algorithm has two input images of two perspectives along one dimension, the output images may support only a one-dimensional parallax effect. When the fusion algorithm has two or more input images of different perspectives along two dimensions, the output images may support the two-dimensional parallax effect.

In particular embodiments, for one-dimensional parallax or two-dimensional parallax, the receiver-side device may display the output images (e.g., sender's face images) at a pre-determined display region of the receiver-side display. For example, the sender's face image may be displayed at the center of the receiver-side display and may not move with respect to the frame of the display (besides showing different perspectives based on the viewer's view angle). In particular embodiments, the system may generate and render videos with head-motion parallax effect based on the view angle of the viewer regardless of the distance between the viewer point and the display. For example, the displayed video may show different perspectives to the viewer when the viewer's view angle changes with respect to the display plane. However, when the viewer moves farther from or toward the display (i.e., distance changing) with the same view angle, the displayed video may show the same perspective of the scene to the viewer and show the displayed object (e.g., sender's face) with the same size (i.e., no zoom-in/out effect).

In particular embodiments, the system may display the output images within a dynamic display region of the receiver-side display and the displayed output images may move with respect to the frame of the display according to the viewpoint of the viewer. For example, when the viewer moves his head horizontally with respect to the display, the sender's face displayed on the screen may show different perspectives to the viewers and, at the same time, move its position relative to the frame of the display. As a result, the viewer may view the sender's face not only with head-motion parallax effect but also a window-frame visual effect as if the viewer is looking at the sender's face through a real window corresponding to the display frame.

In particular embodiments, by using an image-based rendering method, the system may allow multiple users to be within the FOVs of the sender-side device. The system may capture images of the scene from different perspectives and reconstruct the scene by generating output images according to the viewer's viewpoint without using 3D models. The system may be agnostic to how many users or objects are within the FOVs of the sender-side cameras. As long as the system can have correspondence information between images of different perspectives, the system may effectively support head-motion parallax effect. For example, when a first user is using the sender-side device to communicate with a viewer using a receiver-side device, the system may continue to effectively support head-motion parallax when a second user walks into the FOVs of the sender-side cameras. In particular embodiments, then multiple users are within the FOVs of the receiver-side device, the system may pick one of the users as the major viewer and render video with head-motion parallax according to the viewpoint of the picked user, or use an average viewpoint of multiple users for rendering videos with head-motion parallax. In particular embodiments, the system may render videos with head-motion parallax to both viewers by displaying different videos to respective users through respective display channels (e.g., multiple VR/AR headsets, multiple displays, light field display, multiple-view display).

In particular embodiments, the system may use a model-based method to render and display videos according to the viewer's viewpoint (instead of using the image-based rendering method or in addition to using the image-based rendering method). In particular embodiments, the sender-side device may include a depth sensor (e.g., a pair of stereo cameras, a LiDAR system) for capturing depth information of the sender-side scene. The sender-side device may include at least one camera for capturing images of the scene. In particular embodiments, the sender-side cameras may include two or more cameras that are arranged at different positions to capture images of the scene from different perspectives. The sender-side device may use these cameras to capture videos of the scene (e.g., from different perspectives) within the cameras' FOVs and use the depth sensor to capture depth information of the scene. In particular embodiments, the depth information of the sender-side scene may be determined using a machine-learning model based on images captured from different perspectives of the scene. The system may use the depth information to generate a geometric model (e.g., a point cloud, a mesh, a contour map, or a 3D object model) for one or more objects (e.g., an object or person) in the scene or for the whole scene in the sender-side cameras' overapplying FOV area.

In particular embodiments, the geometric model may be generated by the sender-side device. For example, the sender-side device may generate and send the perspective images and the geometric model to the receiver-side device. The receiver-side device may generate the viewpoint-based output images using these perspective images and the geometric model. In particular embodiments, the geometric model may be generated by the receiver-side device. The sender-side device may send the captured images of different perspectives and the depth information of the scene to the receiver-side device. The receiver-side device may generate the geometric model and render the head-motion-based video based on the geometric model. In particular embodiments, the receiver-side device may use a ray-casting method to determine which area of the geometric model is visible to the viewer from the viewer's viewpoint. Then, the receiver-side device may determine the texture information for the visible areas by sampling the corresponding images and generate corresponding output images to be displayed to the viewer.

Figure 7A:
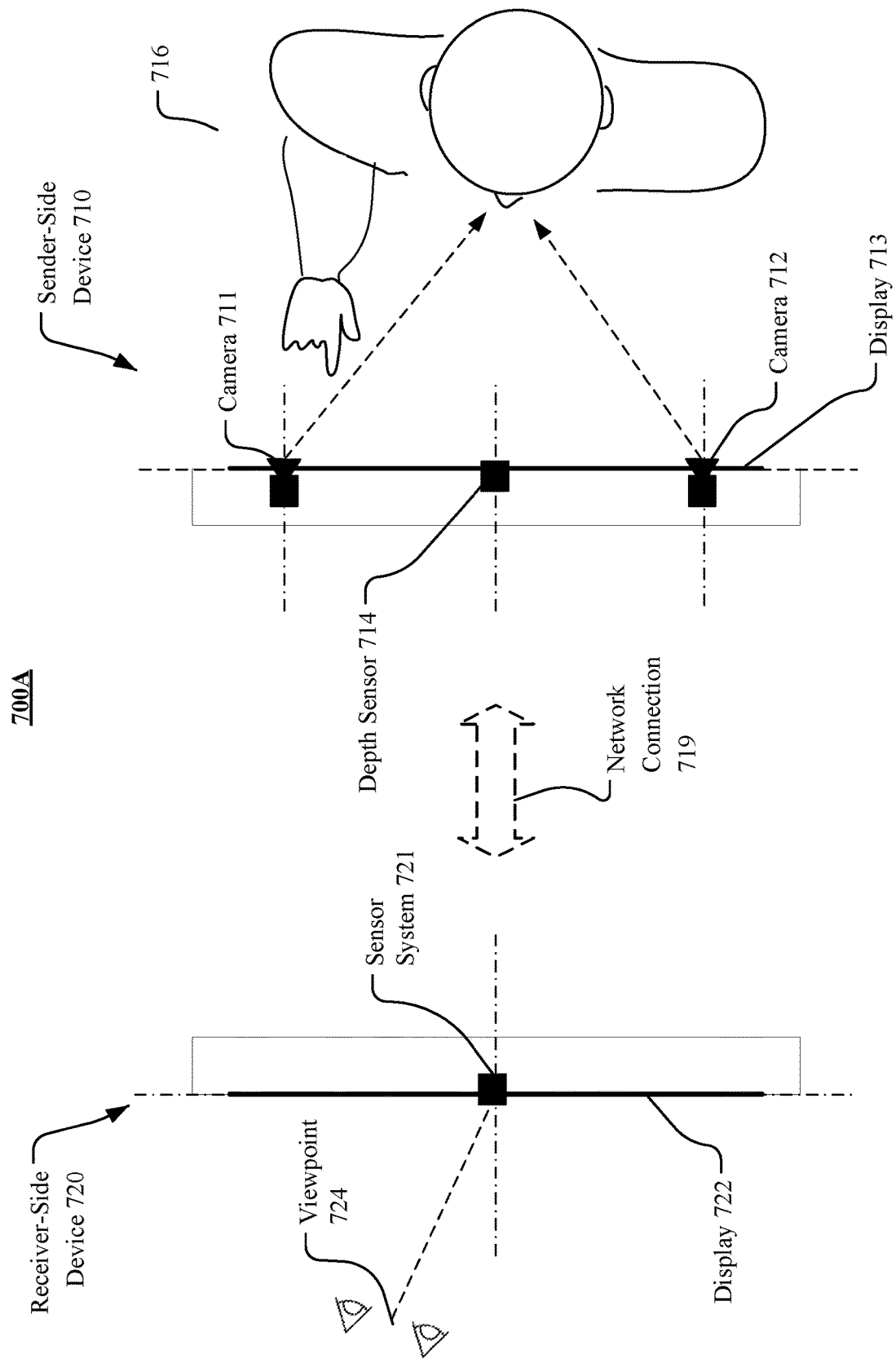
FIG. 7A illustrates an example videotelephony system using a model-based rendering method.

FIG. 7A illustrates an example videotelephony system 700A using a model-based rendering method. As an example and not by way of limitation, the sender-side device 710 may include a depth sensor 714 (e.g., a pair of stereo cameras, a LiDAR system) and two cameras 711 and 712 for capturing images of the scene at the sender side. The sender-side device 710 may use the cameras 711 and 712 to capture a video of the scene in the cameras' FOVs from two different perspectives. The sender-side device 710 may use the depth sensor 714 to capture depth information of the scene. The sender-side device 710 may use the depth information to generate a geometric model (e.g., a point cloud, a mesh, a contour map, or a 3D object model) for a particular object or person in the scene within the FOVs of the sender-side cameras. The sender-side device 710 may send the captured images and the geometric model to the receiver-side device 720. The receiver-side device may use a sensor system 721 (e.g., a head tracking system, an eye-tracking system) to determine the viewpoint 724 of the viewer and may render the viewpoint-based video based on the images received from the sender-side device, the geometric model, and the viewpoint of the viewer. For example, the receiver-side device 720 may use a ray-casting method to determine which areas of the geometric model are visible to the viewer based on the viewer's viewpoint. Then, the receiver-side device 720 may determine the texture information for the visible areas of the geometric model by sampling corresponding perspective images to generate output images to be displayed to the viewer (as described in later sections of this disclosure). In particular embodiments, the geometric model may be generated by the receiver-side device 720. The sender-side device 710 may send the captured images and the depth information of the scene to the receiver-side device 720. The receiver-side device 720 may generate the geometric model and render the head-motion-based video based on the geometric model.

Figure 7B:
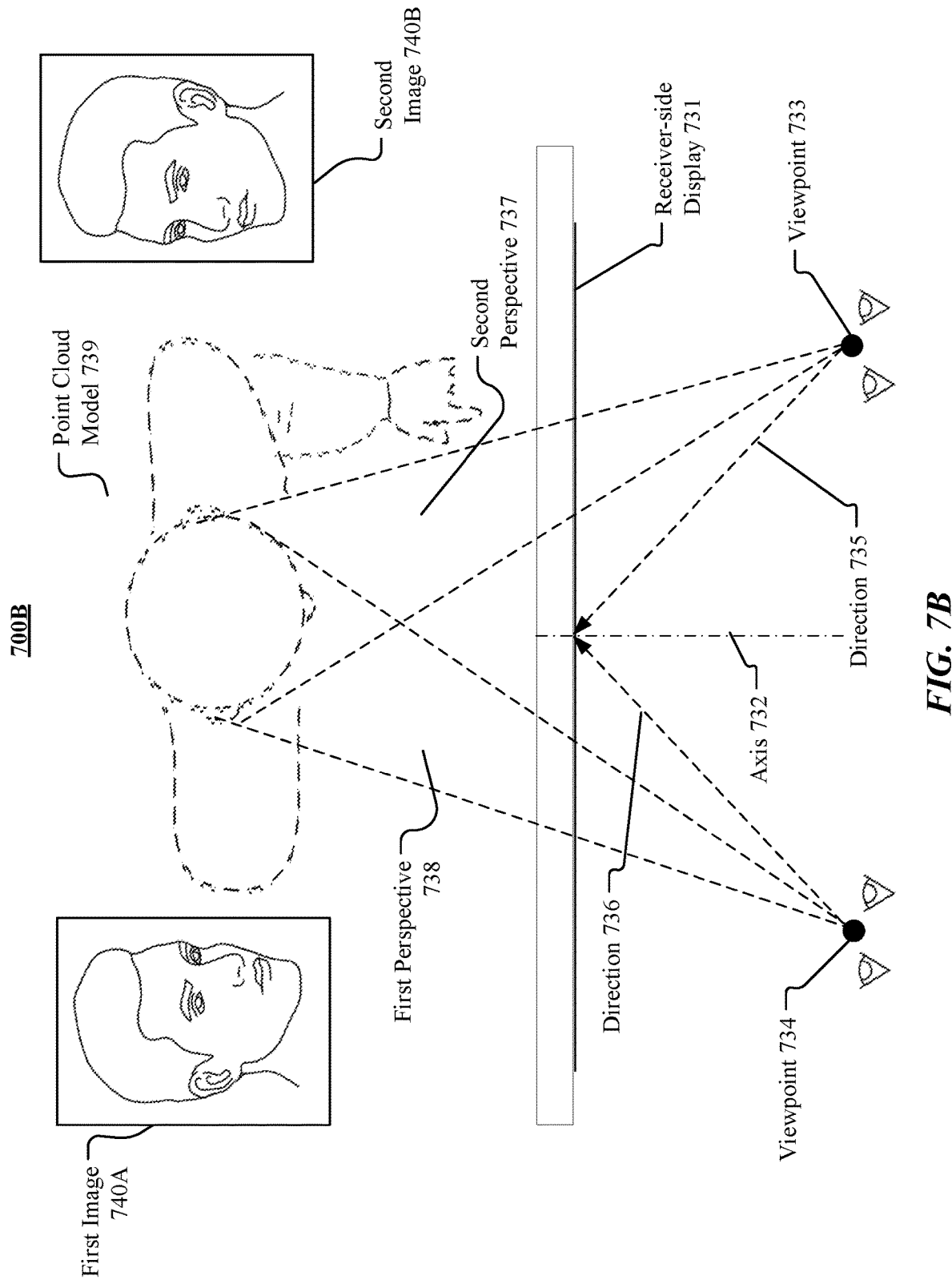
FIG. 7B illustrates an example process for generating output images based on a point cloud model.

FIG. 7B illustrates an example process 700B for generating output images based on a point cloud model. In particular embodiments, the sender-side device may use a depth sensor (e.g., stereo cameras, a LiDAR system) to generate a point cloud for the scene (e.g., including a person or an object) within the sender-side cameras' FOVs to represent a 3D model of the scene. At the same time, the sender-side device may use one or more cameras to capture the RGB images of the scene. Then, the system may (e.g., by the sender-side device or the receiver-side device) generate the output images based on the RGB images and the point cloud of the scene. As an example and not by way of limitation, the sender-side device may generate a point cloud model 739 for the sender based on sensor data received from one or more depth sensors and capture two RGB images 740A and 740B from different perspectives using two cameras. The sender-side device may send the point of could model 739 and the RGB images 740A and 740B to the receiver-side device. The receiver-side device may use a head tracking system or an eye-tracking system to determine the viewpoint (e.g., 733, 734) of the viewer. Then, the receiver-side device may determine the view direction or view angle (e.g., 735, 736) of the viewer with respect to the receiver-side display 731. Then, the receiver-side device may virtually position the point cloud model 739 in a virtual space at a computed distance to the viewpoint (e.g., 733, 734) of the viewer. The computed distance between the point cloud model and the viewpoint may be determined based on the actual distance between the sender and the sender-side cameras.

Then, the receiver-side device may determine the perspectives of the point of cloud model 739 as viewed from the viewer's viewpoint. For example, from the viewpoint 734, the sender as represented by the point cloud model 739 may be viewed by the viewer from a first perspective of 738. As another example, from the viewpoint 733, the sender as represented by the point cloud model 739 may be viewed by the viewer from a second perspective of 737. Then, the receiver-side device may determine the subset of points in the point cloud model 739 that are within the visible area to the viewer. For a particular depth point (of the subset of points) that is within the visible area to the viewer, the receiver-side device may identify one or more first pixels in the first image 740A and one or more second pixels in the second image 740B that are corresponding to that particular point. The one or more first pixels in the first image 740A may be within an image portion being associated with a particular feature. The one or more second pixels in the second image 740B may be within an image portion being associated with the same particular feature associated with the one or more first pixels in the first image 740A. Then, the receiver-side device may determine one or more pixel values corresponding to that particular depth point based on a weighted average of the one or more first pixels in the first image 740A and the one or more pixels in the second image 740B. The corresponding weight values may be determined based on the current viewpoint (e.g., 733, 734) of the viewer (e.g., using a method similar to the method illustrated in FIG. 6B). It is notable the rendering process using two perspective images is for example purpose and the systems, methods, and processes are not limited thereto. In particular embodiments, the system may use any suitable number of images captured from different perspectives. For example, the system may use four images that are captured from different perspectives to determine the pixel values of the output images. The system may use a process that is similar to linear interpolation, bilinear interpolation, or tri-linear interpolation to determine the pixel values of the output image based on the corresponding pixel values of different perspective images.

In particular embodiments, the sender-side device may use a depth sensor (e.g., stereo cameras, a LiDAR system) to capture the depth information of the scene and generate a geometric model for an object or a person in the scene. In particular embodiments, the geometric model may be represented as a 3D mesh grid with or without mesh surfaces. In particular embodiment, the geometric model may be generated based on depth information of the scene or/and images of the scene that are captured from different perspectives. In particular embodiments, the geometric model may be generated by one or more machine-learning models. In particular embodiments, the geometric model may be generated by the sender-side device or the receiver-side device based on the availability of the computational resources. As an example and not by way of limitation, the sender-side device may capture the depth information of the scene using one or more depth sensors. Then, the sender-side device may capture RGB images of the scenes from different perspectives. The system (e.g., the sender-side device or the receiver-side device) may generate a geometric model based on the depth information or/and the images of the scene that are captured from different perspectives. After that, the receiver-side device may generate the output images by casting rays from the viewer's viewpoint to the geometric model and sampling the RGB images for determining the pixel values. The receiver-side device may divide the two-dimensional perspective images into a number of image portions (e.g., triangles) and use the image portions to tesselate the mesh grid of the 3D model.

Figure 7C:
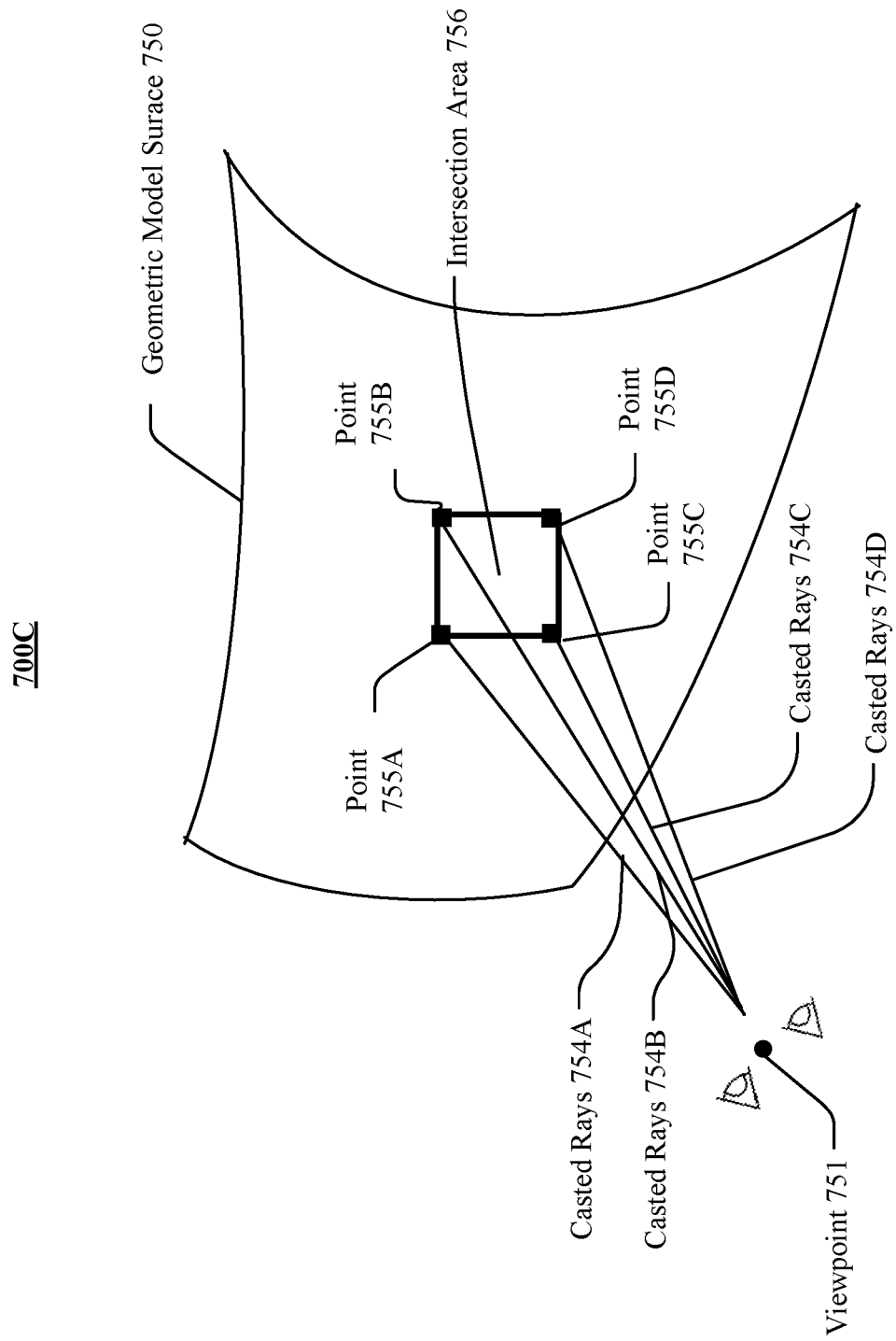
FIG. 7C illustrates an example process for determining pixel values for an output image based on a geometric model.

FIG. 7C illustrates an example process 700C for determining pixel values for an output image based on a geometric model. As an example and not by way of limitation, the system may use a ray-casting algorithm to virtually cast four rays 754A, 754B, 754C, and 754D from the viewpoint 751 of the viewer to the geometric model surface 750. The casted four rays of 754A, 754B, 754C, and 754D may intersect with the geometric model surface 750 at four points of 755A, 755B, 755C, and 755D, respectively. The system may determine that the corresponding intersection area 756 is visible to the viewer based on the determination that the casted rays intersect with the geometric model surface in this area. Then, the system may access one or more RGB images to determine the texture information for this intersection area visible to the viewer from the viewpoint 751. For example, the system may identify, in each perspective image, an image portion that corresponds to the intersection area of the geometric model. Then, the system may and determine the texture for that intersection area based on one or more corresponding image portions of one or more perspective images. The system may determine the texture for that intersection area by blending the corresponding image portions according to the blending proportions computed based on viewpoint 751 of the viewer. Then, the system may determine the pixel values in the intersection area based on the blending results. When the system has images captured from two perspectives, the blending proportion may be determined based on the one-dimensional view angle of the viewer. When the system has three or more images of different perspectives, the blending proportion may be determined based on the two-dimensional view angle of the viewer. When the system has four images from four different perspectives, the blending process may use a method that is similar to a bi-linear or tri-linear interpolation process. The system may repeat this ray-casting process to determine all the areas on the geometric model that are visible to the viewer and determine the corresponding texture information for these visible areas.

In particular embodiments, the pixel values in the output image may be determined based on a weighted average of the corresponding pixels of multiple images that are captured from different perspectives. In particular embodiments, the pixel values may be determined based on the pixel values of a particular image captured from a particular perspective that is closest to the current perspective as viewed from the viewer's viewpoint. In particular embodiments, the pixel values may be determined based on the pixel values of a particular image captured from a particular perspective that captures a shadow area missed by other images from other perspectives. After the output images are generated, the receiver-side device may display the output images to the viewer on the display of the receiver-side device. When the viewer's viewpoint changes with respect to the display of the receiver-side device, the video as displayed to the viewer may reveal different perspectives of the scene within the FOVs of the sender-side device's cameras and may appear as if the viewer is looking at the sender-side scene in the real world.

FIG. 8A illustrates an example of a monoscopic display 810. In particular embodiments, the videotelephony system may use a monoscopic display which, at a particular moment, may display the same image to both eyes of the viewer. As an example and not by way of limitation, a monoscopic display 810 may include an array of pixels 811 (and an optional back-light source 802 depending on the pixel type of display). When an image is displayed on the monoscopic display 810, at least a subset of pixels of the array of pixels 810 may be lighted up and emit light to a space within the viewable angle according to corresponding pixel values of the displayed image. The emitted light 814 corresponding to the same displayed image may reach both the left eye 816A and the right eye 816B of the viewer. As a result, when a viewer looks at the monoscopic display 810, both the left and right eyes of the viewer may see the same image displayed using the same set of pixels. The displayed image may appear "flat" (e.g., no stereo effect) to the viewer. By tracking the viewpoint (e.g., a head position or a center position of eyes) of the viewer and displaying images according to the viewer's viewpoint, particular embodiments of the system may use a monoscopic display to achieve a head-motion parallax effect allowing a viewer to see different perspectives of the scene when the viewer has different viewpoints or view angles with respect to the monoscopic display 810.

FIG. 8B illustrates an example lenticular display 820 which displays different images to the left and right eyes of a viewer. To further provide stereoscopic effects, particular embodiments may render two separate videos, one for each eye. In particular embodiments, the receiver-side device may render two videos based on the left eye position and the right eye position of the viewer, respectively, and display the two videos respectively on two channels of a display (e.g., a lenticular display or a VR/AR headset display) corresponding to the viewer's respective eye positions. In particular embodiments, the videotelephony system may use a lenticular display which, at a particular time moment, may simultaneously display two different images to the left eye and right eye of the user to achieve a stereo effect. As an example and not by way of limitation, a lenticular display 820 may include an array of pixels (e.g., 821A, 821B, 822A, 822B, 823A, 823B, 824A, 824B, 825A, 825B), an array of lenticular lenses 822 on the top of the pixel array, and an optional backlight source 823 (depending on the pixel type of display). The lenticular display 820 may be used to display stereo images corresponding to different perspectives of a scene. To display stereo images on the lenticular display 820, a first subset of pixels (e.g., 821A, 822A, 823A, 824A, 825A) of the array of pixels may be lighted up to emit light according to corresponding pixel values of a first image corresponding to a first perspective of the scene. And, a second subset of pixels (e.g., 821B, 822B, 823B, 824B, 825B) of the array of pixels may be lighted up to emit light according to corresponding pixel values of a second image corresponding to a second perspective of the scene. Here, the first perspective of the first image may correspond to the viewpoint of the right eye 826B of the viewer. The second perspective of the second image may correspond to the viewpoint of the left eye 826A of the viewer.

In particular embodiments, the light emitted by the first subset of pixels (e.g., 821A, 822A, 823A, 824A, 825A) may be directed by the corresponding lenticular lens toward the left eye 826A. The light emitted by the second subset of pixels (e.g., 821B, 822B, 823B, 824B, 825B) may be directed by the corresponding lenticular lens toward the right eye 826B. As a result, when a viewer looks at the lenticular display 820 displaying stereo images, the left and right eyes of the viewer may see different images that capture different perspectives of the scene. The displayed stereo images may appear to have a stereo effect to the viewer. By tracking the eye positions of the viewer's both eyes and displaying different stereo images to the viewer, particular embodiments of the system may use a lenticular display to achieve both a head-motion parallax effect and a stereo effect and allow a viewer to see different perspectives of the scene when: (1) the viewer has different viewpoints with respect to the display, or (2) the viewer uses different eyes to look at the lenticular display. In particular embodiments, the videotelephony system may use two displays to display different perspective images to the viewer's two eyes. For example, VR/AR systems may use two monoscopic displays to display images of different perspectives to the viewer's two eyes, respectively.

Figure 9A:
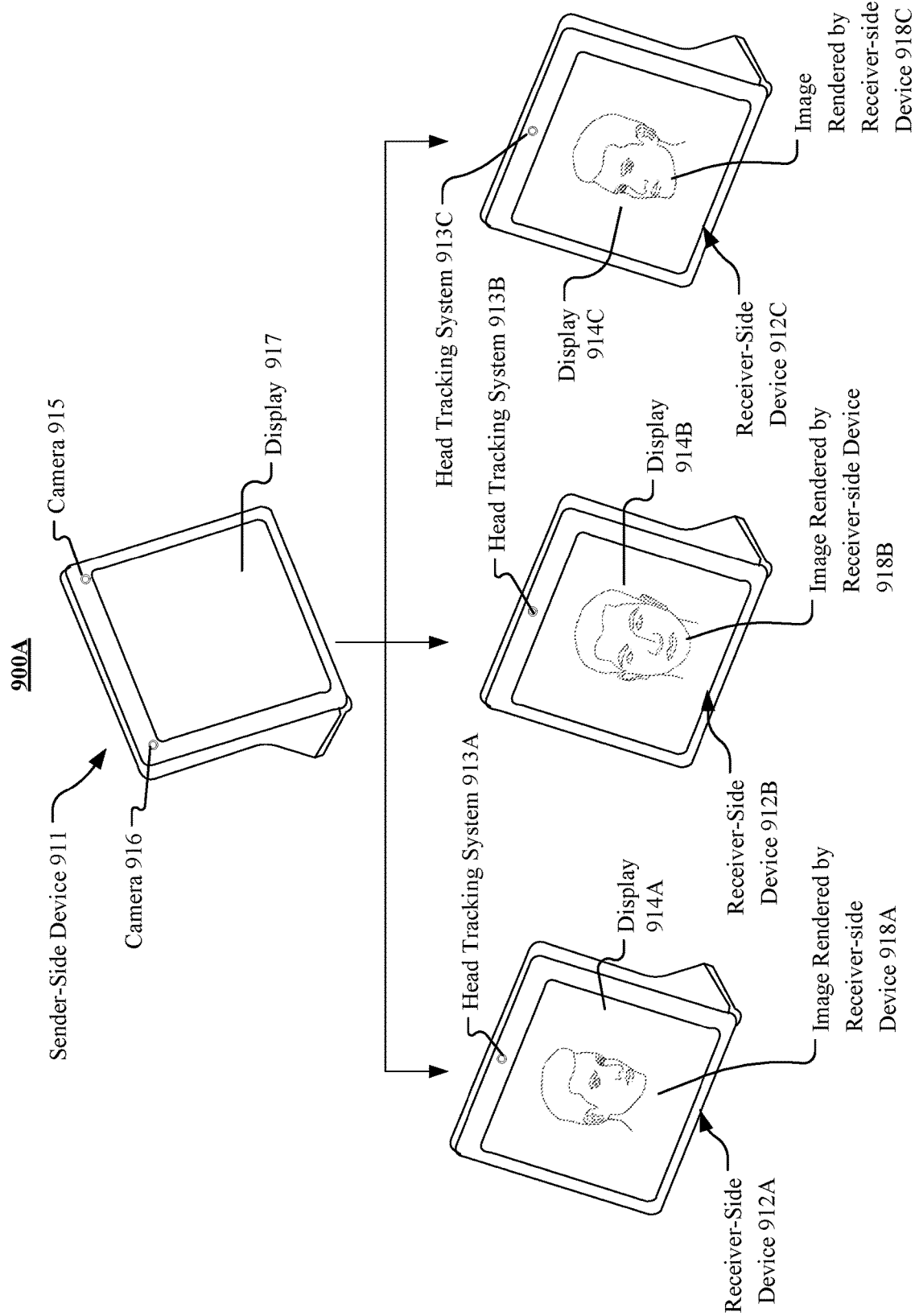
FIG. 9A illustrates an example videotelephony system where one sender-side device supports multiple receiver-side devices.

FIG. 9A illustrates an example videotelephony system 900A where one sender-side device supports multiple receiver-side devices. In particular embodiments, the rendering process (e.g., image-based rendering or model-based rendering) may be performed by the receiver-side device. In particular embodiments, one single sender-side device may support multiple receiver-side devices simultaneously or concurrently. For example, the sender-side device may capture video frames from different perspectives (with or without the depth data) and send the image data and camera position information to all receiver-side devices. Each receiver-side device may render its own video (e.g., using the image-based rendering method or model-based rendering method) based on the corresponding viewer's viewpoint. As a result, each viewer may view the scene from a different perspective according to the viewer's viewpoint or view angle. As an example and not by way of limitation, the sender-side device 911 may have two cameras 915 and 916 arranged at different positions of the sender-side device 911. The two cameras 915 and 916 may have overlapping FOVs. The two cameras 915 and 916 may be synchronized to capture video streams containing images of the scene corresponding to different perspectives. The captured video streams together with camera position information of the cameras 915 and 916 may be sent to multiple receiver-side devices (e.g., 912A, 912B, and 912C). Each receiver-side device (e.g., 912A, 912B, or 912C) may use its own head tracking system (e.g., 913A, 913B, or 913C) to determine the head position of the corresponding viewer, generate and display output images (e.g., 918A, 918B, 918C) according to the viewpoint of the corresponding viewer to achieve the head-motion parallax effect. Since the video streams with the head-motion parallax effect are generated locally on the respective receiver-side devices, the single sender-side device 911 may support a number of receiver-side devices simultaneously or concurrently.

Figure 9B:
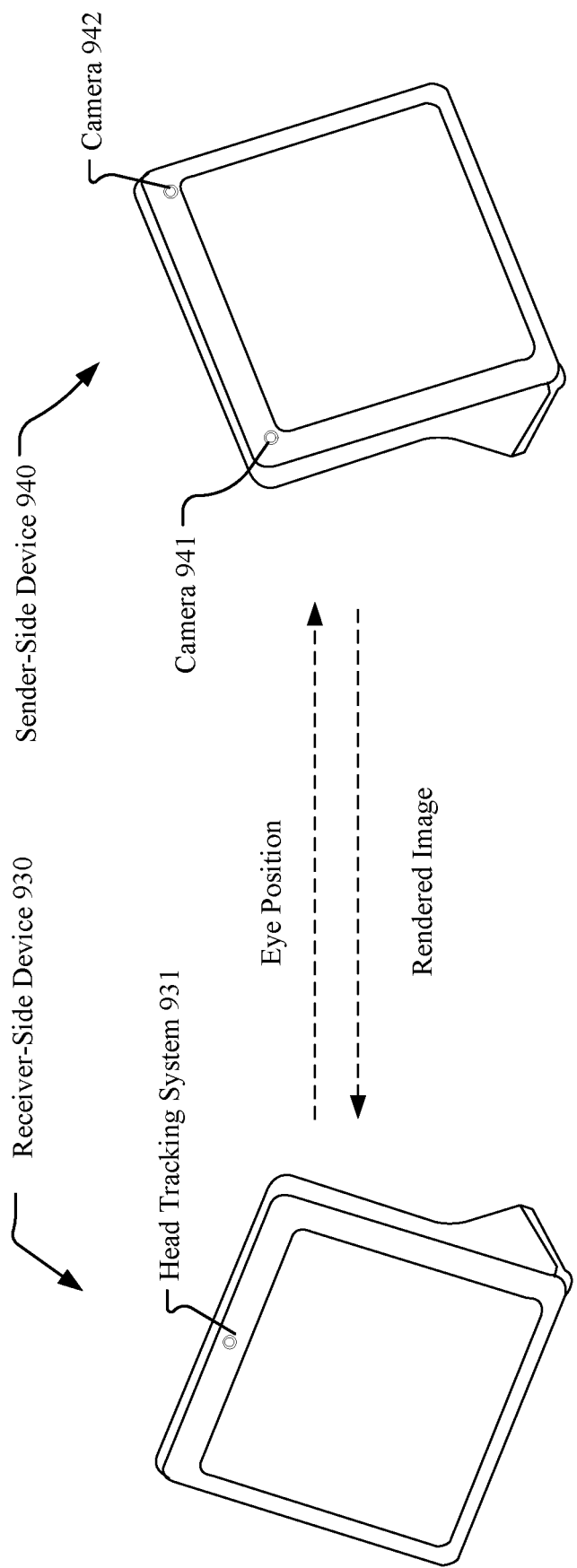
FIG. 9B an example videotelephony system where the rendering process is performed by a sender-side device.

FIG. 9B an example videotelephony system 900D where the rendering process is performed by a sender-side device. In particular embodiments, the rendering process may be performed by the sender-side device. As an example and not by way of limitation, the receiver-side device 931 may determine the viewpoint of the viewer based on the head position or eye positions and send the viewpoint information to the sender-side device 940. The sender-side device 940 may predict the viewpoint of the viewer by factoring in the round-way communication latency and generate the output images for the predicted viewpoint of the viewer. For example, the sender-side device may predict the viewer's head position use Kalman filter predictor factoring in the round-trip communication latency. The sender-side device 940 may send the output images to the receiver-side device 931 for display. This configuration may allow low-end receiver-side devices, which may have less computational resources and capability, to display video with the head-motion parallax effect.

Figure 9C:
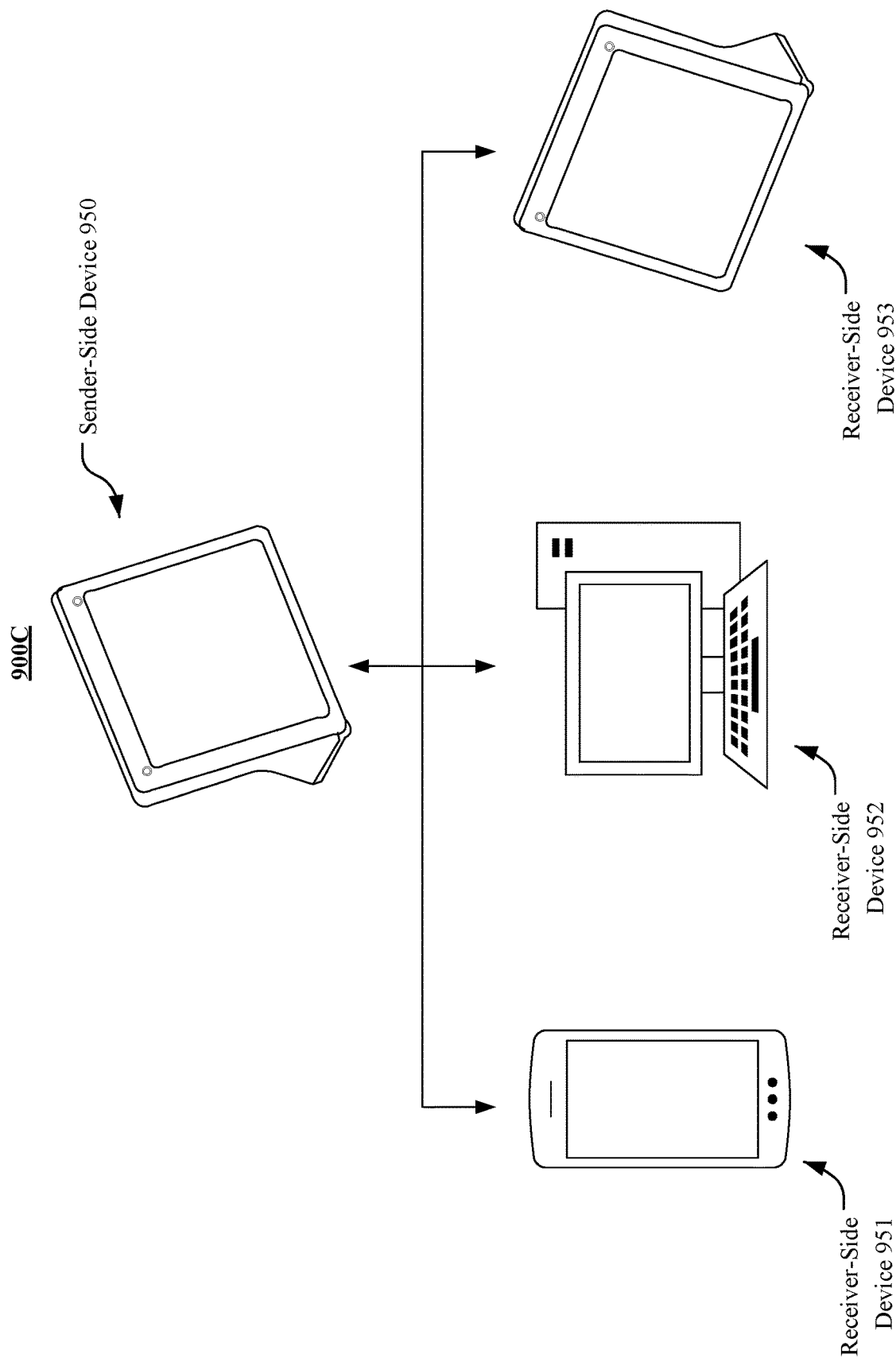
FIG. 9C illustrates an example process for dynamically determining system configuration.

FIG. 9C illustrates an example process 900C for dynamically determining system configuration. In particular embodiments, the system may adaptively determine which device (e.g., the sender-side device or the receiver-side device) to perform the rendering process based on the available computation resources or/and configuration of each device. As an example and not by way of limitation, the sender-side device 950 may first communicate with the receiver-side device (e.g., 951, 952, or 953) to determine the available computation resources on the receiver-side device (e.g., 951, 952, or 953). When the receiver-side device (e.g., 951) is a relatively low-cost device with less computational resources than a pre-determined threshold, the system may configure the sender-side device 950 to perform the rendering process. When the receiver-side device (e.g., 952) has more computational resources than a pre-determined threshold, the system may configure the receiver-side device (e.g., 952) to perform the rendering process. When the receiver-side device (e.g., 953) has similar computational resources to the sender-side device 950, the system may allocate the computational task based on the rendering methods. For example, the image-based rendering process may be performed by the receiver-side device 950 while the model-based rendering may be performed by the sender-side device 953. In particular embodiments, the system may be configured to allow the receiver-side device 950 to decide the computational task allocation between the sender-side device 953 and the receiver-side device 950. By adaptively configuring the videotelephony system and dynamically allocating the computational tasks, particular embodiments of the system may allow a wide range of devices to achieve head-motion parallax effect and provide optimal performance efficiencies.

In particular embodiments, the system may allow the viewer at the receiver-side device to control what will be displayed for the sender-side scene using a virtual camera. In particular embodiments, the sender-side device may have a number of cameras for capturing images from different perspectives. The system may create a virtual camera based on the images captured from the actual camera and allow the viewer to control the virtual camera parameters including, for example, camera positions, camera view angles, etc. For example, the viewer may choose to put the virtual camera at the center of the sender-side screen. As a result, the sender may appear to look at the camera even the sender is looking at the center of the screen (not the physical position of the cameras). As another example, the viewer may use a controller (e.g., a joystick) to control the virtual camera to have a god view image, a side-view image, a bottom-view image, etc. In particular embodiments, the system may use machine-learning models or artificial intelligence algorithms for synthesizing depth data or/and hallucinating missing image portions to generate output images for the virtual cameras.

Figure 10:
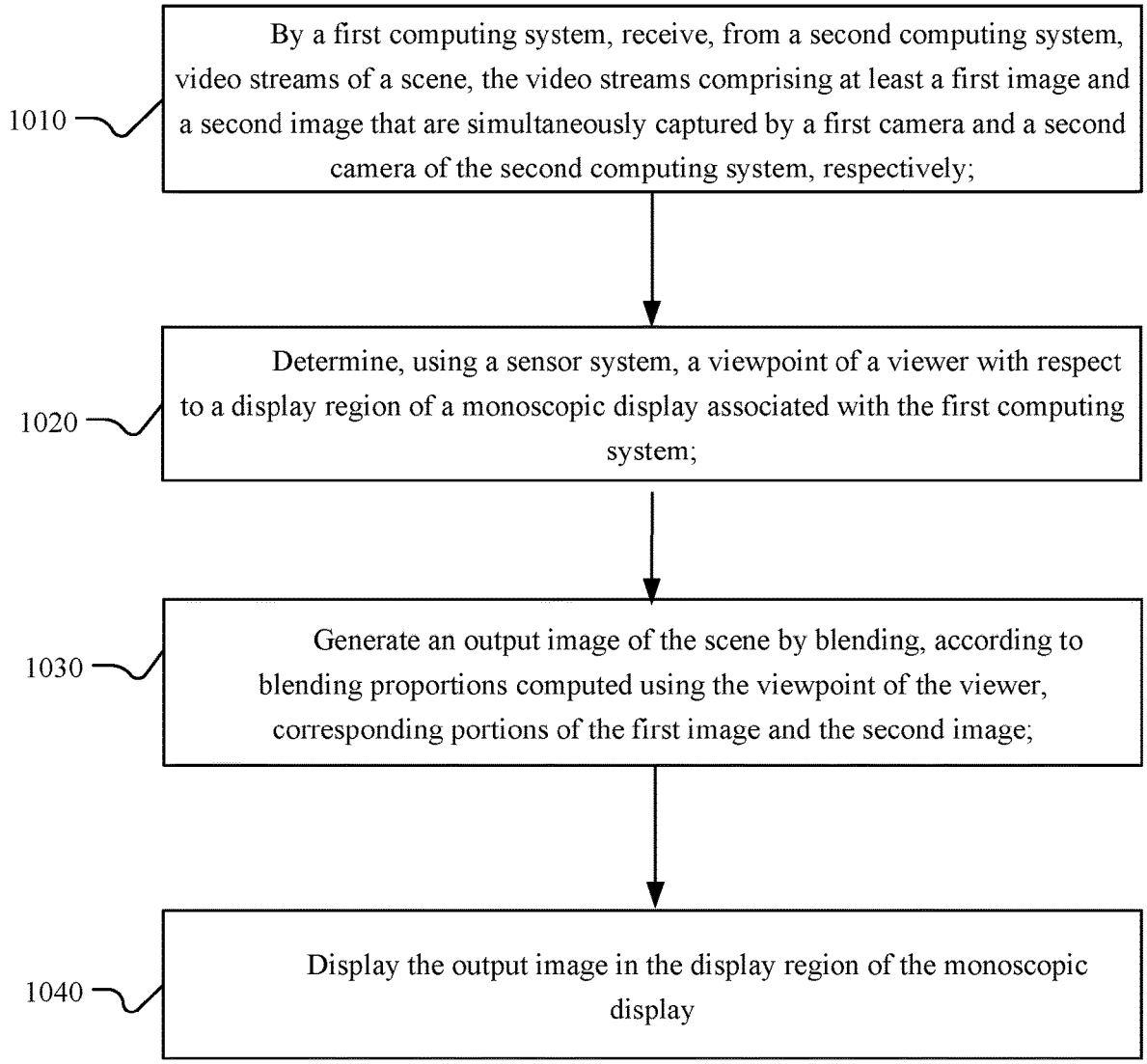
FIG. 10 illustrates an example method of generating output images for a monoscopic display to have head-motion parallax effect.

FIG. 10 illustrates an example method 1000 of generating output images for a monoscopic display to have a head-motion parallax effect. The method may begin at step 1010, where a first computing system may receive, from a second computing system, video streams of a scene, the video streams comprising at least a first image and a second image that are simultaneously captured by a first camera and a second camera of the second computing system, respectively. At step 1020, the first computing system may determine, using a sensor system, a viewpoint of a viewer with respect to a display region of a monoscopic display associated with the first computing system; At step 1030, the first computing system may generate an output image of the scene by blending, according to blending proportions computed using the viewpoint of the viewer, corresponding portions of the first image and the second image. At step 1040, the first computing system may display the output image in the display region of the monoscopic display.

In particular embodiments, the corresponding portions of the first image and the second image may be identified by matching one or more first features captured in the first image to one or more second features captured in the second image The corresponding portions of the first image and the second image may depict the same object. In particular embodiments, a pixel value in the output image may be determined based on a weighted average of corresponding pixel values in the corresponding portions of the first image and the second image according to the blending proportions computed using the viewpoint of the viewer. In particular embodiments, the first camera and the second camera of the second computing system may be arranged at different positions. The first image and the second image of the scene may be captured from different perspectives. In particular embodiments, the video streams may include a third image captured simultaneously with the first image and the second image by a third camera associated with the second computing system. The first camera, the second camera, and the third camera may be arranged at three positions forming a two-dimensional plane. The output image of the scene may be generated by blending, according to the blending proportions computed using the viewpoint of the viewer, corresponding portions of the first image, the second image, and the third image.

In particular embodiments, the system may determine a two-dimensional view angle of the viewer with respect to the display region of the monoscopic display based on the viewpoint of the viewer. The blending proportions may be determined based at least on the two-dimensional view angle of the viewer. In particular embodiments, the blending proportions may be determined based on an angular proportion value of the two-dimensional view angle of the viewer with respect to boundary angles of a pre-determined conical volume corresponding to a viewable range for a head-motion parallax effect. In particular embodiments, the video streams may further include a third image of the scene captured by a third camera of the second computing system and a fourth image of the scene captured by a fourth camera of the second computing system, the third image and the fourth image being captured simultaneously with the first image and the second image, The output image of the scene may be generated based on a bilinear interpolation of the first image, the second image, the third image, and the fourth image of the scene according to the viewpoint of the viewer.

In particular embodiments, the system may receive extrinsic camera properties of the first camera and the second camera. The blending proportions may be determined based on the extrinsic camera properties of the first camera and the second camera and the viewpoint of the viewer. In particular embodiments, the system may determine an opposite view angle based on a view angle corresponding to the viewpoint of the viewer. The opposite view angle may be symmetric to the view angle corresponding to the viewpoint of the viewer with respect to an axis perpendicular to the region display. In response to a user input switching a display mode of the first computing system, the system may generate a subsequent output image based on the opposite view angle and display the subsequent output image on the display to the viewer. A character in the scene may appear to follow the viewer when the viewpoint of the viewer changes.

In particular embodiments, the first camera and the second camera of the second computing system may be arranged along an oblique direction with respect to the scene. The output image of the scene may be generated based on a two-dimensional view angle of the viewer with respect to the monoscopic display. The two-dimensional view angle may be computed based on a relative position of the viewpoint of the viewer with respect to the display region. In particular embodiments, the output image may be displayed at a fixed position with respect to the display region when the viewpoint of the viewer changes with respect to the display region. In particular embodiments, the output image may be displayed at a dynamic position with respect to the display region when the viewpoint of the viewer changes with respect to the display region. The dynamic position for displaying the output image may be determined based on the viewpoint of the viewer. In particular embodiments, the output image may be generated based on a virtual camera position configured by the viewer.

Figure 11:
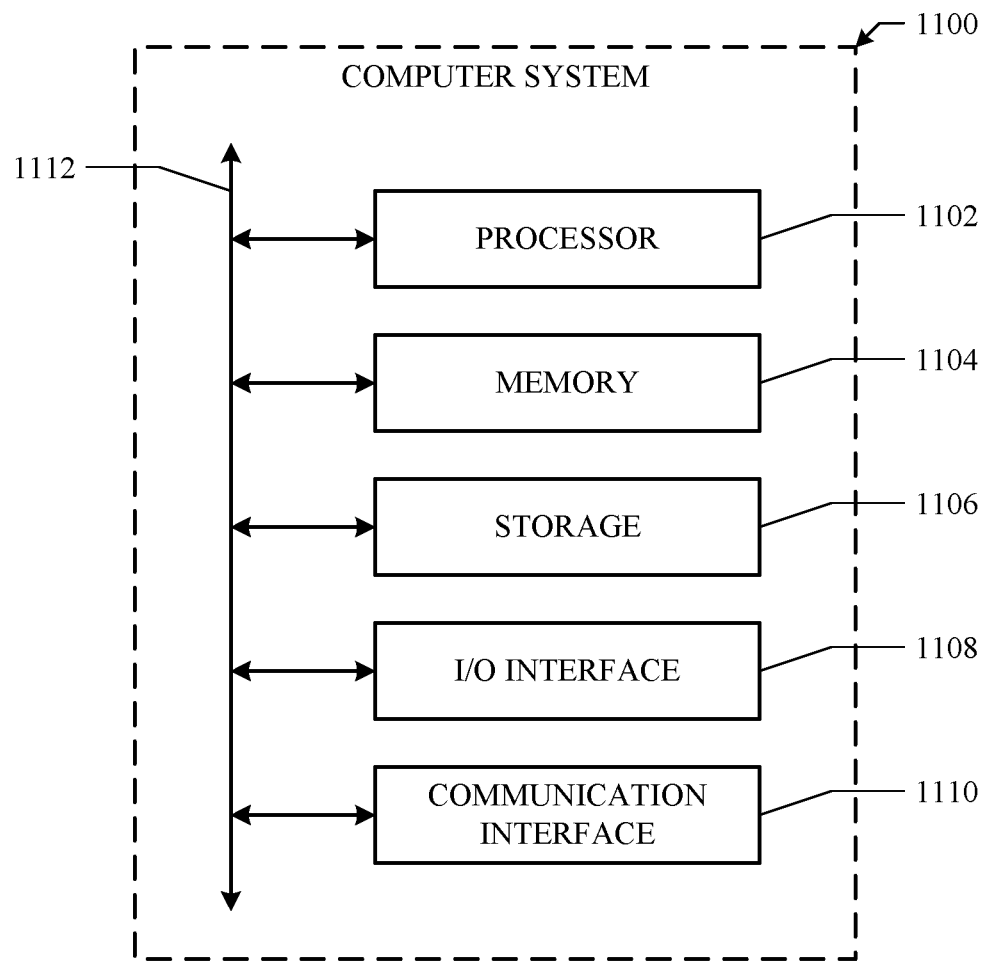
FIG. 11 illustrates an example computer system.

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method of generating output images for a monoscopic display to have head-motion parallax effect including the particular steps of the method of FIG. 11, this disclosure contemplates any suitable method of generating output images for a monoscopic display to have head-motion parallax effect including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, a reference to a computer system may encompass a computing device, and vice versa, where appropriate. Moreover, a reference to a computer system may encompass one or more computer systems, where appropriate.

This disclosure contemplates any suitable number of computer systems 1100. This disclosure contemplates computer system 1100 taking any suitable physical form. As an example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real-time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1102. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after the execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1102 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates a particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storage 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1102 includes hardware, software, or both coupling components of computer system 1100 to each other. As an example and not by way of limitation, bus 1102 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1102 may include one or more buses 1102, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, a reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a first computing system:
   receiving, from a second computing system, video streams of a scene, the video streams comprising at least a first image and a second image that are simultaneously captured by a first camera and a second camera of the second computing system, respectively;
   determining, using a sensor system, a view angle of a viewer with respect to a display region of a monoscopic display associated with the first computing system;
   generating an output image of the scene by blending, according to blending proportions computed using the view angle of the viewer, at least a first portion of the first image and a second portion of the second image, wherein pixel values of the output image are determined based on (1) values of the blending proportions computed using the viewpoint view angle of the viewer and (2) corresponding pixel values of at least the first portion of the first image and the second portion of the second image, and wherein the values of the blending proportions are determined based on a comparison of the view angle of the viewer to a predetermined view angle range; and
   displaying the output image in the display region of the monoscopic display.

2. The method of claim 1, wherein the first portion of the first image and the second portion of the second image are identified by matching one or more first features captured in the first image to one or more second features captured in the second image, and wherein the first portion of the first image and the second portion of the second image are associated with a same feature.

3. The method of claim 1, wherein a pixel value in the output image is determined based on a weighted average of the corresponding pixel values in the first portion of the first image and the second portion of the second image according to the blending proportions computed using the view angle of the viewer.

4. The method of claim 1, wherein the first camera and the second camera of the second computing system are arranged at different positions, and wherein the first image and the second image of the scene are captured from different perspectives.

5. The method of claim 1, wherein:
the video streams further comprise a third image captured simultaneously with the first image and the second image by a third camera associated with the second computing system,
the first camera, the second camera, and the third camera are arranged at three positions forming a two-dimensional plane, and
the output image of the scene is generated by blending, according to the blending proportions computed using the view angle of the viewer, the first portion of the first image, the second portion of the second image, and a third portion of the third image.

6. The method of claim 5,
wherein the view angle is a two-dimensional view angle determined based on a viewpoint of the viewer, and wherein the blending proportions are determined based at least on the two-dimensional view angle of the viewer.

7. The method of claim 6, wherein the blending proportions are determined based on an angular proportion value of the two-dimensional view angle of the viewer with respect to boundary angles of a pre-determined conical volume corresponding to a viewable range for a head-motion parallax effect.

8. The method of claim 1, wherein:
the video streams further comprise a third image of the scene captured by a third camera of the second computing system and a fourth image of the scene captured by a fourth camera of the second computing system, the third image and the fourth image being captured simultaneously with the first image and the second image;
the output image of the scene is generated based on a bilinear interpolation of the first image, the second image, the third image, and the fourth image of the scene according to a relative position of a viewpoint of the viewer with respect to the display region.

9. The method of claim 1, further comprising:
receiving extrinsic camera properties of the first camera and the second camera, wherein the blending proportions are determined based on the extrinsic camera properties of the first camera and the second camera and the view angle of the viewer.

10. The method of claim 1, further comprising:
determining an opposite view angle based on the view angle of the viewer, wherein the opposite view angle is symmetric to the view angle of the viewer with respect to an axis perpendicular to the display region;
in response to a user input switching a display mode of the first computing system, generating a subsequent output image based on the opposite view angle; and
displaying the subsequent output image on the monoscopic display to the viewer, wherein a character in the scene appears to follow the viewer when the view angle of the viewer changes.

11. The method of claim 1, wherein the first camera and the second camera of the second computing system are arranged along an oblique direction with respect to the scene, wherein the view angle is a two-dimensional angle of the viewer determined based on a viewpoint of the viewer, and wherein the output image of the scene is generated based on the two-dimensional view angle of the viewer with respect to the display region.

12. The method of claim 1, wherein the output image is displayed at a fixed position with respect to the display region when the view angle of the viewer changes with respect to the display region.

13. The method of claim 1, wherein the output image is displayed at a dynamic position with respect to the display region when the view angle of the viewer changes with respect to the display region, and wherein the dynamic position for displaying the output image is determined based on the view angle of the viewer.

14. The method of claim 1, wherein the output image is generated based on a virtual camera position configured by the viewer.

15. One or more computer-readable non-transitory storage media embodying software that is operable when executed by a first computing system to:
receive, from a second computing system, video streams of a scene, the video streams comprising at least a first image and a second image that are simultaneously captured by a first camera and a second camera of the second computing system, respectively;
determine, using a sensor system, a view angle of a viewer with respect to a display region of a monoscopic display associated with the first computing system;
generate an output image of the scene by blending, according to blending proportions computed using the view angle of the viewer, at least a first portion of the first image and a second portion of the second image, wherein pixel values of the output image are determined based on (1) values of the blending proportions computed using the view angle of the viewer and (2) corresponding pixel values of at least the first portion of the first image and the second portion of the second image, and wherein the values of the blending proportions are determined based on a comparison of the view angle of the viewer to a predetermined view angle range; and
display the output image in the display region of the monoscopic display.

16. The media of claim 15, wherein the first portion of the first image and the second portion of the second image are identified by matching one or more first features captured in the first image to one or more second features captured in the second image, and wherein the first portion of the first image and the second portion of the second image are associated with a same feature.

17. The media of claim 15, wherein a pixel value in the output image is determined based on a weighted average of corresponding pixel values in the first portion of the first image and the second portion of the second image according to the blending proportions computed using the view angle of the viewer.

18. A system comprising: one or more processors; and a memory coupled to the processors comprising instructions executable by the processors, the processors being operable when executing the instructions to:
receive, from a second computing system, video streams of a scene, the video streams comprising at least a first image and a second image that are simultaneously captured by a first camera and a second camera of the second computing system, respectively;

determine, using a sensor system, a view angle of a viewer with respect to a display region of a monoscopic display associated with the first computing system;

generate an output image of the scene by blending, according to blending proportions computed using the view angle of the viewer, at least a first portion of the first image and a second portion of the second image, wherein pixel values of the output image are determined based on (1) values of the blending proportions computed using the view angle of the viewer and (2) corresponding pixel values of at least the first portion of the first image and the second portion of the second image, and wherein the values of the blending proportions are determined based on a comparison of the view angle of the viewer to a predetermined view angle range; and display the output image in the display region of the monoscopic display.

19. The system of claim 18, wherein the first portion of the first image and the second portion the second image are identified by matching one or more first features captured in the first image to one or more second features captured in the second image, and wherein the first portion of the first image and the second portion of the second image are associated with a same feature.

20. The system of claim 18, wherein a pixel value in the output image is determined based on a weighted average of corresponding pixel values in the first portion of the first image and the second portion of the second image according to the blending proportions computed using the view angle of the viewer.

* * * * *